United States Patent
Li et al.

(10) Patent No.: US 12,353,086 B2
(45) Date of Patent: Jul. 8, 2025

(54) ARRAY SUBSTRATE, DISPLAY DEVICE, AND DRIVE-FOR-HEATING METHOD FOR DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Pengtao Li, Beijing (CN); Rui Han, Beijing (CN); Peng Liu, Beijing (CN); Chunhua Wang, Beijing (CN); Xiaoqiao Dong, Beijing (CN); Qi Fu, Beijing (CN); Tiantian Liu, Beijing (CN); Qiannan Pan, Beijing (CN); Xiaoxia Wang, Beijing (CN); Yang Wang, Beijing (CN); Xiwang Xing, Beijing (CN); Jie Yu, Beijing (CN); Dong Cui, Beijing (CN); Qing Ma, Beijing (CN); Daekeun Yoon, Beijing (CN); Site Cai, Beijing (CN); Biqi Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/564,590

(22) PCT Filed: Feb. 28, 2023

(86) PCT No.: PCT/CN2023/078742
§ 371 (c)(1),
(2) Date: Nov. 27, 2023

(87) PCT Pub. No.: WO2024/178612
PCT Pub. Date: Sep. 6, 2024

(65) Prior Publication Data
US 2025/0085580 A1    Mar. 13, 2025

(51) Int. Cl.
G02F 1/1333    (2006.01)
G02F 1/1362    (2006.01)
G02F 1/1368    (2006.01)

(52) U.S. Cl.
CPC .... *G02F 1/133382* (2013.01); *G02F 1/13338* (2013.01); *G02F 1/136286* (2013.01); *G02F 1/1368* (2013.01)

(58) Field of Classification Search
CPC ........... G02F 1/133382; G02F 1/13338; G02F 1/136286; G02F 1/1368
See application file for complete search history.

(56) References Cited

U.S. PATENT DOCUMENTS 8,027,013 B2    9/2011    Liu et al.
10,295,855 B2    5/2019    Zhou et al.
(Continued)

FOREIGN PATENT DOCUMENTS

CN    201083912 Y    7/2008
CN    101655620 A    2/2010
(Continued)

OTHER PUBLICATIONS

Espacenet English machine translation of CN113238403A (Year: 2021).*

*Primary Examiner* — Michael H Caley
*Assistant Examiner* — David Y Chung
(74) *Attorney, Agent, or Firm* — Kinney & Lange, P.A.

(57) ABSTRACT

An array substrate, a display device, and a drive-for-heating method for the display device. The array substrate includes: pixel units on a first base substrate; a data line on the first base substrate; a touch signal line on the first base substrate; a heating element on the first base substrate, and configured to generate heat under driving of a drive-for-heating current; a common electrode on the first base substrate and reused as (Continued)

a touch electrode; and a pixel electrode on the first base substrate. The thin film transistor includes an active layer in a semiconductor layer and a gate electrode in a first conductive layer. The data line is in a second conductive layer, one of the pixel electrode and the common electrode is in a third conductive layer, and a layer where the heating element is located is between the semiconductor layer and the third conductive layer.

16 Claims, 26 Drawing Sheets

(56) References Cited

U.S. PATENT DOCUMENTS

| | | | |
|---|---|---|---|
| 10,866,450 B2 | 12/2020 | Zhao et al. | |
| 10,962,817 B2 | 3/2021 | Zhao et al. | |
| 11,215,861 B2 | 1/2022 | Zhao | |
| 2010/0045913 A1 | 2/2010 | Liu et al. | |
| 2014/0055696 A1* | 2/2014 | Lee | G02F 1/133305 349/20 |
| 2016/0180781 A1* | 6/2016 | Kim | G09G 3/3655 345/212 |
| 2018/0203279 A1 | 7/2018 | Zhou et al. | |
| 2019/0353940 A1 | 11/2019 | Zhao et al. | |
| 2020/0201109 A1 | 6/2020 | Zhao et al. | |
| 2020/0341329 A1 | 10/2020 | Zhao | |
| 2023/0384630 A1 | 11/2023 | Su et al. | |
| 2023/0402464 A1 | 12/2023 | Zhang et al. | |

FOREIGN PATENT DOCUMENTS

| | | | | |
|---|---|---|---|---|
| CN | 101655621 A | 2/2010 | | |
| CN | 105739155 A | 7/2016 | | |
| CN | 105912180 A | 8/2016 | | |
| CN | 107092117 A | 8/2017 | | |
| CN | 108761930 A | 11/2018 | | |
| CN | 109387962 A | 2/2019 | | |
| CN | 111128025 A | 5/2020 | | |
| CN | 112346269 A | 2/2021 | | |
| CN | 112965284 A | 6/2021 | | |
| CN | 113109963 A | 7/2021 | | |
| CN | 113109964 A | 7/2021 | | |
| CN | 113189810 A | 7/2021 | | |
| CN | 113238403 A | * | 8/2021 | G02F 1/133382 |
| CN | 114690463 A | 7/2022 | | |
| CN | 114815358 A | 7/2022 | | |
| CN | 114815359 A | 7/2022 | | |

* cited by examiner

ARRAY SUBSTRATE, DISPLAY DEVICE, AND DRIVE-FOR-HEATING METHOD FOR DISPLAY DEVICE

CROSS REFERENCE TO RELATED APPLICATION(S)

This is a Section 371 National Stage Application of International Application No. PCT/CN2023/078742, filed on Feb. 28, 2023, entitled "ARRAY SUBSTRATE, DISPLAY DEVICE, AND DRIVE-FOR-HEATING METHOD FOR DISPLAY DEVICE".

TECHNICAL FIELD

The present disclosure relates to a field of display technology, and in particular, to an array substrate, a display device, and a drive-for-heating method for the display device.

BACKGROUND

Liquid crystal display panels have been widely used in recent years. A liquid crystal display panel used in an automotive rearview electronic mirror generally operates in a low-temperature environment. In order to ensure an imaging time and an image display quality of the automotive rearview electronic mirror, it is generally needed to heat liquid crystals in the liquid crystal display panel. Existing heating solutions mainly involve providing an external heating source to ensure that a display module operates at a suitable temperature in a low-temperature environment due to the external heating source, so as to improve a response speed. However, such method has a low heating efficiency, and the external heating source is bulky, resulting in an increase in an overall module thickness.

The above information disclosed in this section is just for the understanding of the background of the inventive concept of the present disclosure. Therefore, the above information may contain information that does not constitute a related art.

SUMMARY

In an aspect, an array substrate is provided, including: a first base substrate; a plurality of pixel units on the first base substrate, where the plurality of pixel units are arranged in an array in a first direction and a second direction, at least one of the plurality of pixel units includes a pixel driving circuit, and the pixel driving circuit includes at least one thin film transistor; a data line on the first base substrate; a touch signal line on the first base substrate; a heating element on the first base substrate, where the heating element is configured to generate heat under a driving of a drive-for-heating current; a common electrode on the first base substrate, where the common electrode is reused as a touch electrode, and the touch electrode is electrically connected to the touch signal line; and a pixel electrode on the first base substrate, where the pixel electrode is electrically connected to the data line through the pixel driving circuit; the array substrate includes: a semiconductor layer on the first base substrate; a first conductive layer on a side of the semiconductor layer away from the first base substrate; a second conductive layer on a side of the first conductive layer away from the first base substrate; a third conductive layer on a side of the second conductive layer away from the first base substrate; and a fourth conductive layer on a side of the third conductive layer away from the first base substrate; the at least one thin film transistor includes an active layer and a gate electrode, the active layer is in the semiconductor layer, the gate electrode is in the first conductive layer, the data line is in the second conductive layer, one of the pixel electrode and the common electrode is in the third conductive layer, and the other of the pixel electrode and the common electrode is in the fourth conductive layer; and a layer in which the heating element is located is between the semiconductor layer and the third conductive layer.

According to some exemplary embodiments, the heating element is in at least one of the first conductive layer or the second conductive layer.

According to some exemplary embodiments, the array substrate further includes a gate line on the first base substrate, and the heating element includes a plurality of heating wires, and the plurality of heating wires and the gate line are in the first conductive layer.

According to some exemplary embodiments, the heating element includes a plurality of heating wires, and the plurality of heating wires and the data line are in the second conductive layer.

According to some exemplary embodiments, the heating element includes a plurality of heating wires, at least one of the plurality of heating wires is in the first conductive layer, and at least another one of the plurality of heating wires is in the second conductive layer.

According to some exemplary embodiments, a plurality of gate lines extend in the first direction and are spaced apart in the second direction, and the plurality of heating wires extend in the first direction and are spaced apart in the second direction, and any two of the plurality of heating wires and the plurality of gate lines are spaced apart in the second direction.

According to some exemplary embodiments, the data line includes a first data line portion, a second data line portion, and a third data line portion between the first data line portion and the second data line portion, the first data line portion extends in a third direction intersecting with the second direction, and the second data line portion extends in a fourth direction intersecting with the second direction; and an orthographic projection of at least one heating wire on the first base substrate overlaps at least partially with an orthographic projection of at least one third data line portion on the first base substrate.

According to some exemplary embodiments, at least one pixel unit includes a plurality of sub-pixels, and the orthographic projection of at least one heating wire on the first base substrate extends through an orthographic projection of a plurality of third data line portions of a row of sub-pixels on the first base substrate.

According to some exemplary embodiments, the plurality of heating wires and the plurality of gate lines are alternately arranged in the second direction; and/or a ratio of a number of the plurality of heating wires to a number of the plurality of gate lines is 1:1.

According to some exemplary embodiments, a plurality of data lines are spaced apart in the first direction, and the plurality of heating wires are spaced apart in the first direction, and any two of the plurality of heating wires and the plurality of data lines are spaced apart in the first direction.

According to some exemplary embodiments, a plurality of touch signal lines are spaced apart in the first direction, and any two of the plurality of heating wires, the plurality of data lines and the plurality of touch signal lines are spaced apart in the first direction.

According to some exemplary embodiments, the pixel unit includes N sub-pixels, the data line is configured to provide data signals to the pixel driving circuits of a column of sub-pixels, and the touch signal line is electrically connected to touch electrodes of N columns of sub-pixels, wherein N is greater than or equal to 2, and N data lines and/or one touch signal line are/is arranged in the first direction between any two adjacent heating wires among the plurality of heating wires.

According to some exemplary embodiments, the heating wire includes a first heating wire portion, a second heating wire portion, and a third heating wire portion between the first heating wire portion and the second heating wire portion, the first heating wire portion extends in a third direction intersecting with the second direction, and the second heating wire portion extends in a fourth direction intersecting with the second direction.

According to some exemplary embodiments, the array substrate includes a display region and a peripheral region, the plurality of pixel units are in the display region, the array substrate includes a first side, a second side, a third side, and a fourth side, the first side and the second side are opposite to each other, and the third side and the fourth side are opposite to each other; the array substrate further includes a gate driving circuit and a data driving circuit in the peripheral region, the gate driving circuit is on at least one of the first side or the second side of the array substrate, and the data driving circuit is on the third side of the array substrate; and the array substrate further includes a heating element binding region in the peripheral region, the heating element binding region is on a side of the gate driving circuit away from the display region, and the plurality of heating wires extend to the heating element binding region.

According to some exemplary embodiments, the array substrate includes a display region and a peripheral region, the plurality of pixel units are in the display region, the array substrate includes a first side, a second side, a third side, and a fourth side, the first side and the second side are opposite to each other, and the third side and the fourth side are opposite to each other; the array substrate further includes a gate driving circuit and a data driving circuit in the peripheral region, the gate driving circuit is on at least one of the first side or the second side of the array substrate, and the data driving circuit is on the third side of the array substrate; and the array substrate further includes a heating element binding region in the peripheral region, the heating element binding region is on the third side of the array substrate, the array substrate further includes at least one heating element lead in the peripheral region, and the plurality of heating wires are electrically connected to a pad in the heating element binding region through the at least one heating element lead.

According to some exemplary embodiments, the array substrate includes a display region and a peripheral region, the plurality of pixel units are located in the display region, the array substrate includes a first side, a second side, a third side, and a fourth side, the first side and the second side are opposite to each other, and the third side and the fourth side are opposite to each other; the array substrate further includes a gate driving circuit and a data driving circuit in the peripheral region, the gate driving circuit is on at least one of the first side or the second side of the array substrate, and the data driving circuit is on the third side of the array substrate; and the array substrate further includes a heating element binding region in the peripheral region, the heating element binding region is on the fourth side of the array substrate, and the plurality of heating wires extend to the heating element binding region.

According to some exemplary embodiments, the array substrate further includes a temperature measurement element provided on the first base substrate, and the temperature measurement element is configured to sense a temperature of a region in which the temperature measurement element is located.

According to some exemplary embodiments, the temperature measurement element includes a plurality of resistance wires extending in the first direction and spaced apart in the second direction; and any two of the plurality of heating wires, the plurality of gate lines and the plurality of resistance wires are spaced apart in the second direction.

According to some exemplary embodiments, the temperature measurement element includes a plurality of resistance wires extending in the second direction and spaced apart in the first direction; and any two of the plurality of heating wires, the plurality of data lines and the plurality of resistance wires are spaced apart in the first direction.

According to some exemplary embodiments, the temperature measurement element includes at least one temperature measurement transistor; the array substrate includes a display region and a peripheral region, and the plurality of pixel units are in the display region; and the at least one temperature measurement transistor is in the peripheral region.

According to some exemplary embodiments, the temperature measurement element further includes at least one calibration transistor configured to calibrate the at least one temperature measurement transistor, and the at least one calibration transistor is in the peripheral region.

In another aspect, a display device is provided, including: the array substrate as described above; an opposite substrate; and a liquid crystal layer between the array substrate and the opposite substrate.

In another aspect, a display device is provided, including: the array substrate as described above; and a drive-for-heating circuit board, where the temperature measurement element is electrically connected to the drive-for-heating circuit board.

According to some exemplary embodiments, the drive-for-heating circuit board includes: a temperature acquisition circuit electrically connected to the temperature measurement element; a drive-for-heating circuit electrically connected to the heating element; and a driving and controlling circuit electrically connected to the temperature acquisition circuit and the drive-for-heating circuit, where the driving and controlling circuit is configured to generate a drive-for-heating current according to a temperature acquired by the temperature acquisition circuit and provide the drive-for-heating current to the drive-for-heating circuit.

According to some exemplary embodiments, the display device is a vehicle-mounted display device.

In another aspect, a drive-for-heating method for the display device described above is provided, including: sensing a temperature by using the temperature measurement element; and generating, in response to a sensed temperature being less than a first temperature threshold, a drive-for-heating current according to the sensed temperature, and heating the display device by using the heating element.

In another aspect, a drive-for-heating method for the display device described above is provided, including: sensing a temperature by using the temperature measurement element; determining whether the display device is in a touch detection state or not, in response to a sensed temperature being less than a first temperature threshold; and generating, in response to the display device not being in the touch detection state, a drive-for-heating current according to the sensed temperature, and heating the display device by using the heating element.

According to some exemplary embodiments, the method further includes: stopping heating the display device using the heating element in response to the sensed temperature being greater than a second temperature threshold; and stopping heating the display device using the heating element in response to the display device being in the touch detection state.

In another aspect, a drive-for-heating method for the display device described above is provided, including: sensing a temperature by using the temperature measurement transistor; determining whether the temperature measurement transistor requires to be calibrated or not; performing a calibration on the temperature measurement transistor by using the calibration transistor, in response to determining that the temperature measurement transistor requires to be calibrated; comparing a sensed temperature of the display device with a predetermined temperature threshold, in response to determining that the temperature measurement transistor does not require to be calibrated; determining whether the display device is in a touch detection state or not, in response to the sensed temperature being less than a first temperature threshold; and generating, in response to the display device not being in the touch detection state, a drive-for-heating current according to the sensed temperature, and heating the display device by using the heating element.

BRIEF DESCRIPTION OF THE DRAWINGS

The above contents and other objectives, features and advantages of the present disclosure will be more apparent through the following descriptions of embodiments of the present disclosure with reference to accompanying drawings, in the drawings.

DETAILED DESCRIPTION OF EMBODIMENTS

Figure 1:
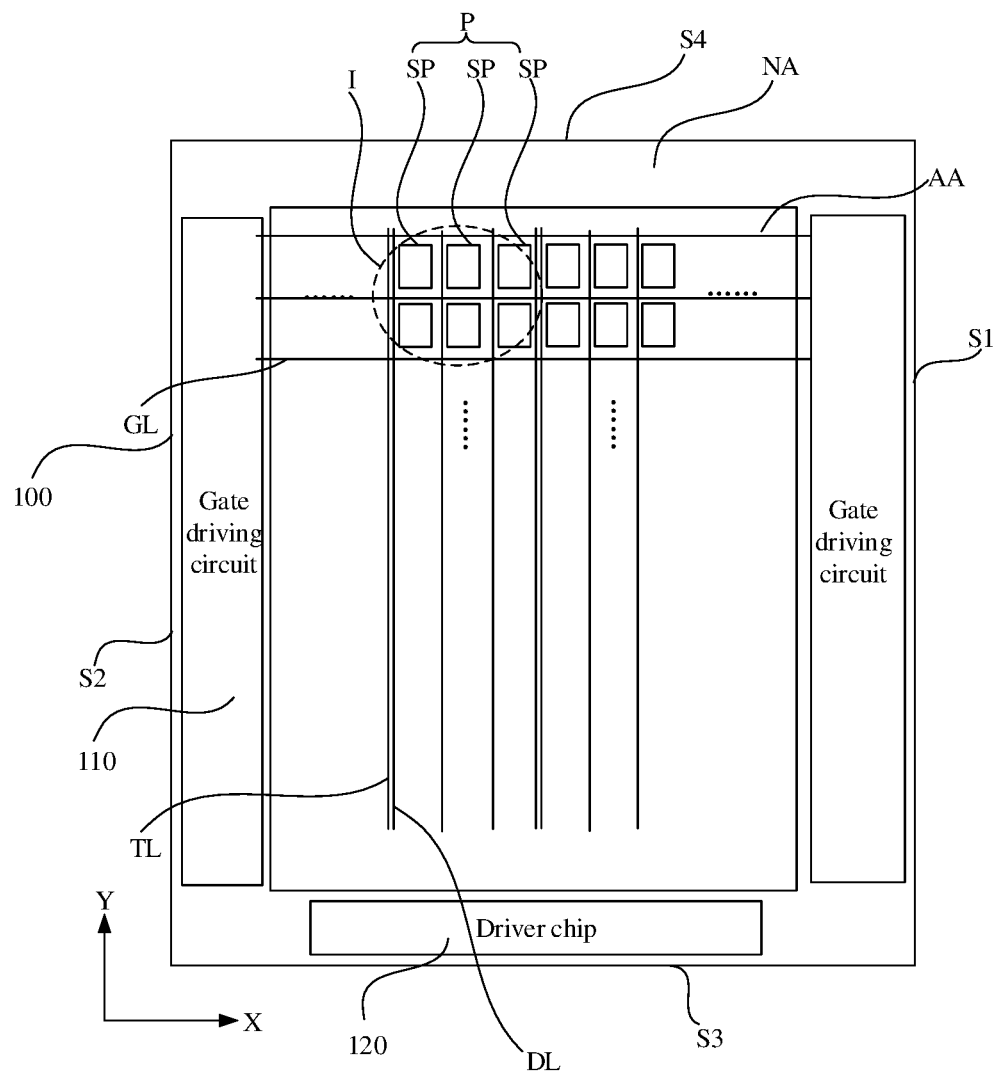
FIG. 1 shows a schematic diagram of a display substrate according to embodiments of the present disclosure.

In order to make objectives, technical solutions and advantages of embodiments of the present disclosure clearer, technical solutions of embodiments of the present disclosure will be clearly and completely described below with reference to the accompanying drawings. Obviously, the described embodiments are just some embodiments rather than all embodiments of the present disclosure. Based on the described embodiments of the present disclosure, all additional embodiments obtained by those ordinary skilled in the art without carrying out inventive effort fall within the scope of protection of the present disclosure.

It should be noted that in the accompanying drawings, for clarity and/or description purposes, a size and relative size of an element may be enlarged. Accordingly, the size and relative size of each element need not to be limited to those shown in the figures. In the specification and the accompanying drawings, the same or similar reference numerals represent the same or similar components.

When an element is described as being "on", "connected to" or "coupled to" another element, the element may be directly on the another element, directly connected to the another element, or directly coupled to the another element, or an intermediate element may be provided. However, when an element is described as being "directly on", "directly connected to" or "directly coupled to" another element, no intermediate element is provided. Other terms and/or expressions used to describe a relationship between elements, such as "between" and "directly between", "adjacent to" and "directly adjacent to", "on" and "directly on", and so on, should be interpreted in a similar manner. Moreover, the term "connection" may refer to a physical connection, an electrical connection, a communicative connection, and/or a fluid connection. In addition, X-axis, Y-axis and Z-axis are not limited to three axes of a rectangular coordinate system, and may be interpreted in a broader meaning. For example, the X-axis, the Y-axis and the Z-axis may be perpendicular to each other, or may represent different directions that are not perpendicular to each other. For objectives of the present disclosure, "at least one selected from X, Y or Z" and "at least one selected from a group consisting of X, Y and Z" may be interpreted as only X, only Y, only Z, or any combination of two or more of X, Y and Z, such as XYZ, YZ, YZ and XZ. As used herein, the term "and/or" includes any and all combinations of one or more of the listed related items.

It should be noted that although the terms "first", "second", and so on may be used herein to describe various components, members, elements, regions, layers and/or portions, these components, members, elements, regions, layers and/or portions should not be limited by these terms. Rather, these terms are used to distinguish one component, member, element, region, layer and/or portion from another one. Thus, for example, a first component, a first member, a first element, a first region, a first layer and/or a first portion discussed below may be referred to as a second component, a second member, a second element, a second region, a second layer and/or a second portion without departing from teachings of the present disclosure.

For ease of description, spatial relationship terms, such as "upper", "lower", "left", "right", may be used herein to describe a relationship between an element or feature and another element or feature as shown in the figures. It should be understood that the spatial relationship terms are intended to cover other different orientations of a device in use or operation in addition to the orientation described in the figures. For example, if a device in the figures is turned upside down, an element or feature described as "below" or "under" another element or feature will be oriented "above" or "on" the another element or feature.

Here, the terms "substantially", "about", "approximately" and other similar terms are used as terms of approximation rather than terms of degree, and they are intended to explain an inherent deviation of a measured or calculated value that will be recognized by those ordinary skilled in the art. Taking into account a process fluctuation, a measurement problem, an error related to a measurement of a specific quantity (that is, a limitation of a measurement system) and other factors, the terms "substantially", "about" or "approximately" used herein includes a stated value and means that a specific value determined by those ordinary skilled in the art is within an acceptable range of deviation. For example, "about" may mean being within one or more standard deviations, or within ±30%, ±20%, ±10% or ±5% of the stated value.

It should be noted that the expression "the same layer" herein refers to a layer structure that is formed by firstly forming, using a same film forming process, a film layer used to form a specific pattern, and then patterning, using one-time patterning process, the film layer with a same mask. Depending on different specific patterns, the one-time patterning process may include a plurality of exposure, development or etching processes, and the specific pattern in the formed layer structure may be continuous or discontinuous. That is, a plurality of elements, components, structures and/or portions located in the "same layer" are made of the same material and formed by the same patterning process. Generally, a plurality of elements, components, structures and/or portions located in the "same layer" have substantially the same thickness.

In the present disclosure, a transistor refers to an element that includes at least a gate electrode, a drain electrode and a source electrode. The transistor has a channel region between the drain electrode (drain electrode terminal, drain region, or drain electrode) and the source electrode (source electrode terminal, source region, or source electrode), and current may flow through the drain electrode, the channel region, and the source electrode. In the present disclosure, the channel region refers to a region where the current mainly flows.

In the present disclosure, in order to distinguish the two electrodes other than the gate electrode of the transistor, one of the electrodes is referred to as a first electrode, and the other electrode is referred to as a second electrode. The first electrode may be the source electrode or the drain electrode, and the second electrode may be the drain electrode or the source electrode. In addition, the gate electrode of the transistor is referred to as a control electrode. When a transistor with opposite polarities is used or a direction of current during a circuit operation changes, the functions of the "source electrode" and the "drain electrode" are sometimes interchanged. Therefore, in the present disclosure, the "source electrode" and the "drain electrode" may be interchanged.

In the present disclosure, an "electrical connection" may include a direct connection between constituent elements, and may also include a connection between constituent elements through an element with an electrical effect. There are no special restrictions on the element with the electrical effect, as long as it may control an electrical signal between the connected constituent elements. Examples of "the element with the electrical effect" include not only an electrode and a wire, but also a switching element such as a transistor, a resistor, an inductor, a capacitor, and other elements with one or more functions.

In the present disclosure, "parallel to" refers to a state where two straight lines form an angle greater than or equal to −10° and less than or equal to 10°, and therefore may include a state where the angle is greater than or equal to −5° and less than or equal to 5°. In addition, "perpendicular to"

refers to a state where two straight lines form an angle greater than or equal to 80° and less than or equal to 100°, and therefore may include a state where the angle is greater than or equal to 85° and less than or equal to 95°.

Embodiments of the present disclosure provide an array substrate. The array substrate includes: a first base substrate; a plurality of pixel units provided on the first base substrate, where the plurality of pixel units are arranged in an array in a first direction and a second direction, at least one of the plurality of pixel units includes a pixel driving circuit, and the pixel driving circuit includes at least one thin film transistor; a data line provided on the first base substrate; a touch signal line provided on the first base substrate; a heating element provided on the first base substrate, where the heating element is used to generate heat under a driving of a drive-for-heating current; a common electrode provided on the first base substrate, where the common electrode is reused as a touch electrode, and the touch electrode is electrically connected to the touch signal line; and a pixel electrode provided on the first base substrate, where the pixel electrode is electrically connected to the data line through the pixel driving circuit. The array substrate includes: a semiconductor layer on the first base substrate; a first conductive layer on a side of the semiconductor layer away from the first base substrate; a second conductive layer on a side of the first conductive layer away from the first base substrate; a third conductive layer on a side of the second conductive layer away from the first base substrate; and a fourth conductive layer on a side of the third conductive layer away from the first base substrate. The at least one thin film transistor includes an active layer and a gate electrode, the active layer is located in the semiconductor layer, the gate electrode is located in the first conductive layer, the data line is located in the second conductive layer, one of the pixel electrode and the common electrode is located in the third conductive layer, and the other of the pixel electrode and the common electrode is located in the fourth conductive layer. A layer where the heating element is located is between the semiconductor layer and the third conductive layer. In embodiments of the present disclosure, the heating element is integrated into the array substrate, and the touch sensor is also integrated into the array substrate, which is conducive to lightness and thinness of the entire touch display panel. Furthermore, the heating element is placed under a layer where the common electrode reused as the touch electrode is located, so that an adverse effect of heating on touch may be avoided, which is conducive to achieving a normal touch function.

FIG. 1 shows a schematic diagram of a display substrate according to embodiments of the present disclosure. Referring to FIG. 1, the display substrate in such embodiments includes a display region AA and a peripheral region NA that at least partially surrounds the display region AA. The display substrate may include a first side S1, a second side S2, a third side S3, and a fourth side S4. The first side S1 and the second side S2 may be opposite to each other, and the third side S3 and the fourth side S4 may be opposite to each other. For example, in embodiments shown in FIG. 1, the first side S1 and the second side S2 may be a right side and a left side of the display substrate, respectively, and the third side S3 and the fourth side S4 may be a lower side and an upper side of the display substrate, respectively.

It should be noted that the left side, the right side, the upper side and the lower side here may refer to a left side, a right side, an upper side and a lower side of the display substrate (screen) viewed by human eyes during display.

Continuing to refer to FIG. 1, the display substrate may include a gate driving circuit 110 and a driver chip 120 that are located in the peripheral region NA. For example, the gate driving circuit 110 may be located on at least one side of the display substrate. In embodiments shown in FIG. 1, the gate driving circuit 110 is located on the first side S1 and the second side S2 of the display substrate. For example, the driver chip 120 may be located on at least one side of the display region AA. In embodiments shown in FIG. 1, the driver chip 120 is located on the third side S3 of the display substrate.

The gate driving circuit 110 may be implemented by a shift register, and the gate driving circuit 110 may provide scanning signals to gate lines GL on the display substrate. The driver chip 120 may include a data driving circuit, which may provide data signals to data lines DL on the display substrate.

It should be noted that FIG. 1 shows the gate driving circuit 110 is located on the left side and the right side of the display region AA, and the driver chip 120 is located on the lower side of the display region AA, but embodiments of the present disclosure are not limited to this. The gate driving circuit 110 and the driver chip 120 may be located at any suitable position in the peripheral region NA.

For example, a GOA technology, namely Gate Driver on Array, may be adopted for the gate driving circuit 110. In the GOA technology, the gate driving circuit 110 is provided directly on the array substrate to replace an external chip. Each GOA unit serves as a stage of shift register, and each stage of shift register is connected to a gate line. Scanning signals are sequentially output through stages of shift registers to achieve progressive scanning of pixel units. In some embodiments, each stage of shift register may also be connected to a plurality of gate lines. In this way, it may adapt to a development trend of high resolution and narrow bezel of display substrates.

The display substrate may further include a first base substrate 10 and a plurality of pixel units P located on the first base substrate 10 and in the display region AA. The plurality of pixel units P are arranged in an array in a first direction X and a second direction Y intersecting with the first direction X. For example, the first direction X is a horizontal direction in FIG. 1, and the second direction Y is a vertical direction in FIG. 1, that is, the first direction X and the second direction Y are perpendicular to each other.

At least one pixel unit P includes a plurality of sub-pixels SP, and the plurality of sub-pixels may be used to display different colors through corresponding color filters. For example, a plurality of sub-pixels SP in a pixel unit P may include a first sub-pixel, a second sub-pixel, and a third sub-pixel. The first sub-pixel may be matched with a red color filter to display red light, the second sub-pixel may be matched with a green color filter to display green light, and the third sub-pixel may be matched with a blue color filter to display blue light.

It should be noted that in FIG. 1, a shape of an orthographic projection of the sub-pixel on the base substrate is schematically shown as a rectangle, but embodiments of the present disclosure are not limited to this. Moreover, an arrangement of three sub-pixels in a pixel unit P is not limited to that shown in FIG. 1.

The display substrate may further include a plurality of data lines DL and a plurality of gate lines GL on the first base substrate 10. As shown in FIG. 1, at least one of the plurality of data lines DL may extend from the fourth side S4 to the third side S3 to be electrically connected to the driver chip 120 located on the third side S3. At least one of the plurality of gate lines GL may extend from the first side S1 to the second side S2 to be electrically connected to the gate driving circuit 110 located on the first side S1 or the second side S2.

In embodiments of the present disclosure, the plurality of data lines DL are spaced apart in the first direction X, and for example, the plurality of data lines DL are electrically connected to a plurality of columns of sub-pixels SP, respectively. The plurality of gate lines GL are spaced apart in the second direction Y, and for example, the plurality of gate lines GL are electrically connected to a plurality of rows of sub-pixels SP, respectively.

Figure 2:
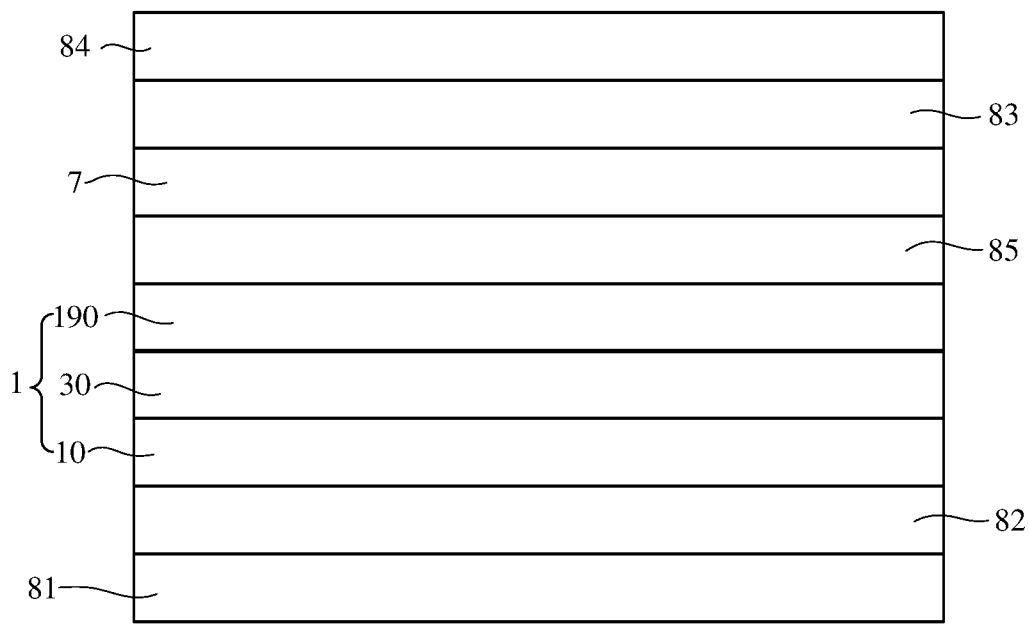
FIG. 2 shows a schematic cross-sectional view of a touch display panel according to some exemplary embodiments of the present disclosure.

In embodiments of the present disclosure, the above-mentioned display substrate may be applied to an in-cell touch display panel, for example, the above-mentioned display substrate may be an array substrate of an in-cell touch display panel. FIG. 2 shows a schematic cross-sectional view of a touch display panel according to some exemplary embodiments of the present disclosure. Referring to FIG. 2, a touch display panel 100 may include a backlight module 81, an array substrate 1, an opposite substrate 7, and a liquid crystal layer 85. For example, the array substrate 1 may have the structure of the above-mentioned display substrate. On this basis, the array substrate 1 may include a heating element and a touch sensor that are provided on the first base substrate 10. For example, a layer 30 in which the heating element is located is on a side of a layer 190 in which the touch sensor is located facing the first base substrate 10, that is, the layer 30 in which the heating element is located is under the layer 190 in which the touch sensor is located. The opposite substrate 7 may include a second base substrate 70 and a color filter element 76 provided on the second base substrate 70. The liquid crystal layer 85 is sandwiched between the array substrate 1 and the opposite substrate 7. The backlight module 81 is provided on a side of the array substrate 1 away from the opposite substrate 7.

Optionally, in embodiments of the present disclosure, the touch display panel may further include a first polarizing element 82, a second polarizing element 83, and a cover plate 84. The first polarizing element 82 may be provided between the backlight module 81 and the array substrate 1, the second polarizing element 83 may be provided on a side of the opposite substrate 7 away from the array substrate 1, and the cover plate 84 may be provided on a side of the second polarizing element 83 away from the array substrate 1.

For example, a pixel design method such as 1P1T, 1P2T or 1P3T may be adopted for the in-cell touch display panel. 1P1T refers to one pixel unit corresponding to one touch signal line, 1P2T refers to one pixel unit corresponding to two touch signal lines, and 1P3T refers to one pixel unit corresponding to three touch signal lines.

For example, as shown in FIG. 1, in an in-cell touch display panel with 1P1T, one pixel unit P corresponds to one touch signal line TL. For example, a pixel unit P includes a plurality of sub-pixels SP having different colors, and the touch signal line TL is located on a left side of a leftmost sub-pixel SP in the pixel unit P corresponding to the touch signal line TL.

It should be noted that herein, the 1P1T pixel design method is illustrated by way of example in describing embodiments of the present disclosures, but embodiments of the present disclosures are not limited to this. In a case of no conflicts, 1P2T, 1P3T or other pixel design methods may be adopted in embodiments of the present disclosure.

Figure 3:
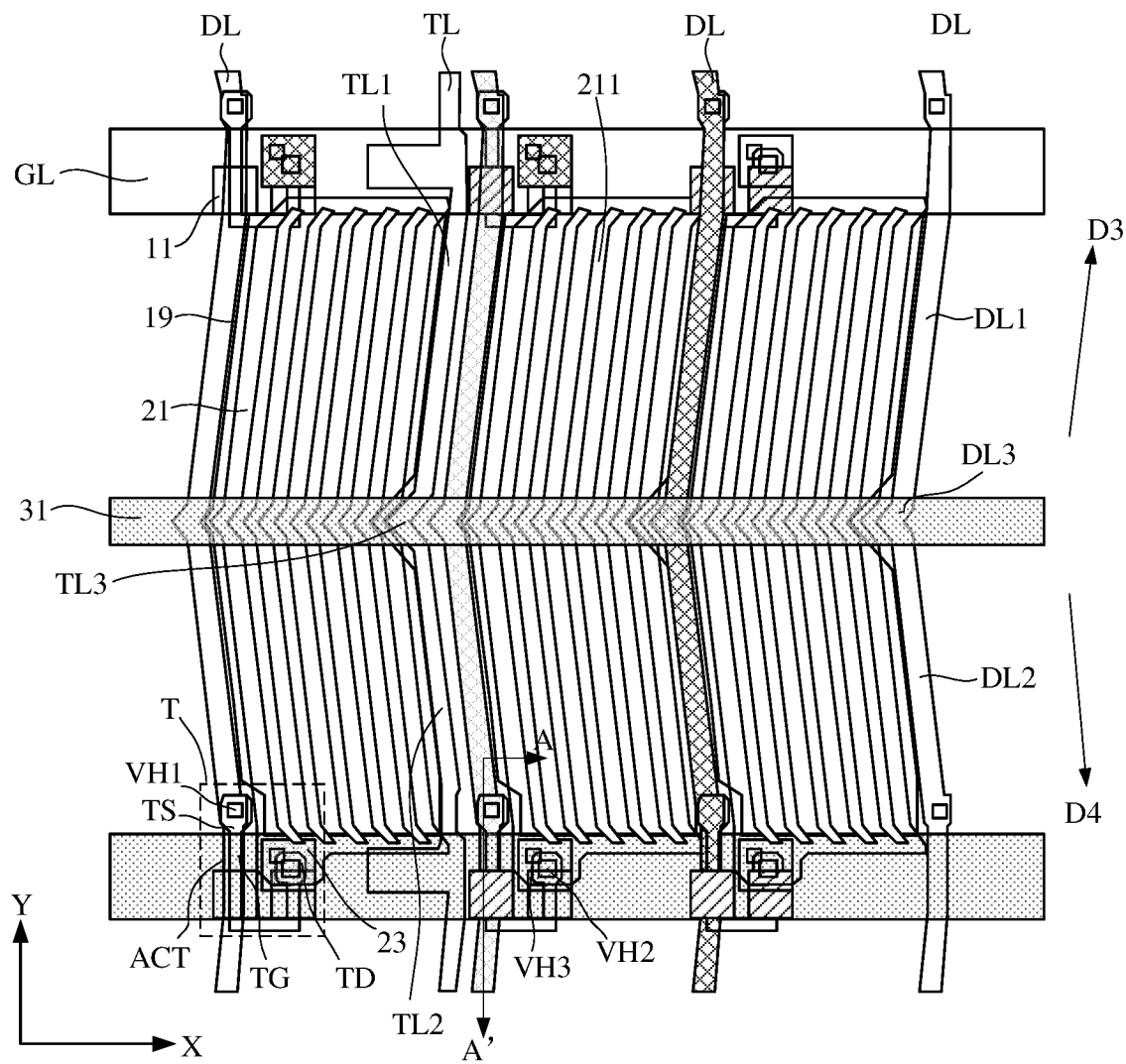
FIG. 3 shows a partially enlarged view of an array substrate at part I in FIG. 1 according to some exemplary embodiments of the present disclosure.
Figure 4:
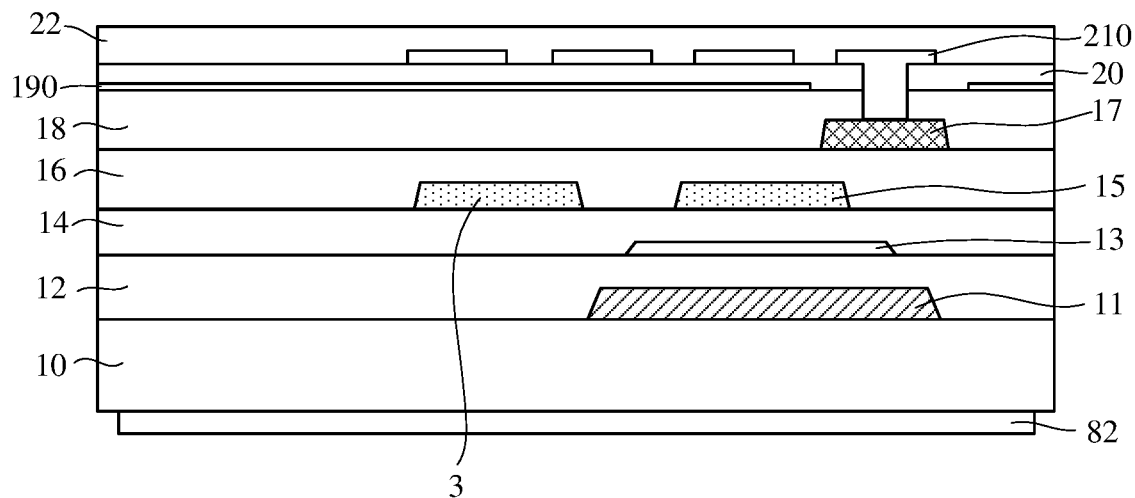
FIG. 4 shows a cross-sectional view of the array substrate taken along line AA' in FIG. 3 according to some exemplary embodiments of the present disclosure.
Figure 5:
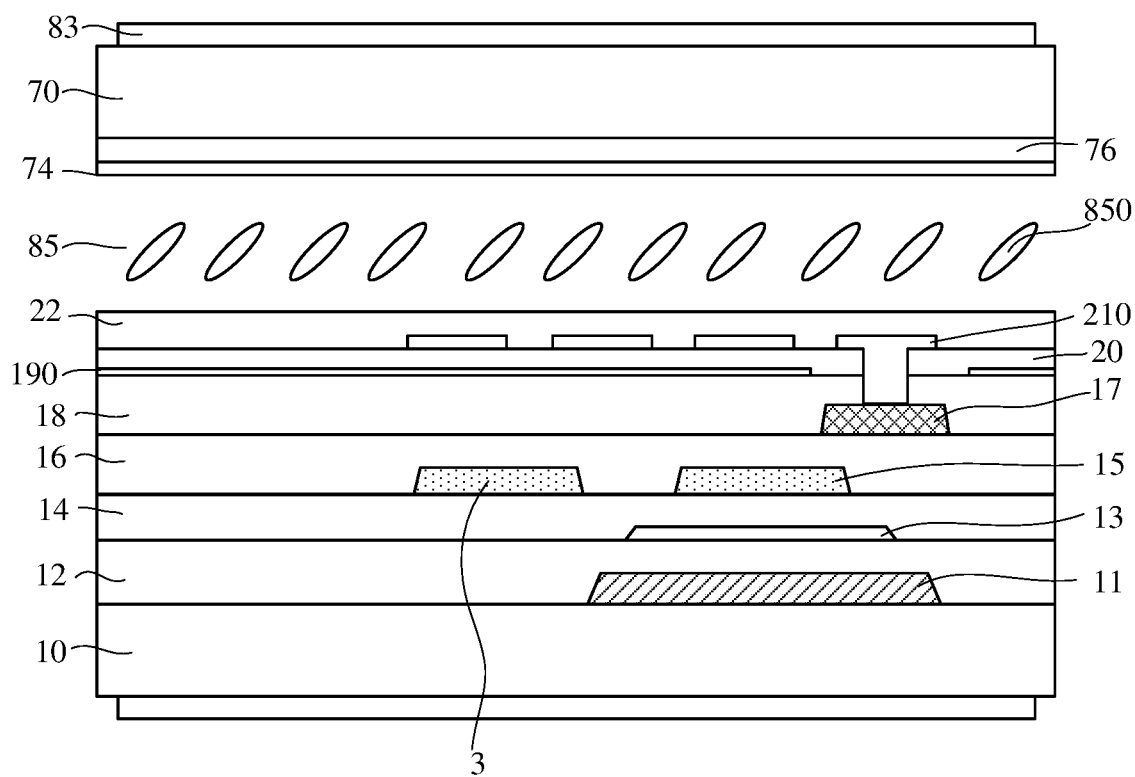
FIG. 5 shows a schematic diagram of a touch display panel including the array substrate shown in FIG. 3.

FIG. 3 shows a partially enlarged view of an array substrate at part I in FIG. 1 according to some exemplary embodiments of the present disclosure. FIG. 4 shows a cross-sectional view of the array substrate taken along line AA' in FIG. 3 according to some exemplary embodiments of the present disclosure. FIG. 5 shows a schematic diagram of a touch display panel including the array substrate shown in FIG. 3.

Referring to FIG. 1 to FIG. 4, the array substrate 1 may include: a first base substrate 10; a plurality of pixel units P provided on the first base substrate 10; a data line DL provided on the first base substrate 10; a touch signal line TL provided on the first base substrate 10; a heating element 3 provided on the first base substrate 10; a common electrode 19 provided on the first base substrate 10; and a pixel electrode 21 provided on the first base substrate 10.

As shown in FIG. 4 and FIG. 5, the array substrate 1 includes: a semiconductor layer 13 on the first base substrate 10; a first conductive layer 15 on a side of the semiconductor layer 13 away from the first base substrate; a second conductive layer 17 on a side of the first conductive layer 15 away from the first base substrate; a third conductive layer 190 (i.e., the conductive layer where the touch sensor is located) on a side of the second conductive layer 17 away from the first base substrate; and a fourth conductive layer 210 on a side of the third conductive layer away from the first base substrate.

The array substrate 1 may include a plurality of insulation layers. For example, the array substrate 1 may further include: a buffer layer 12 between a light shielding portion 11 and the semiconductor layer 13; a gate insulation layer 14 between the semiconductor layer 13 and the first conductive layer 15; an interlayer dielectric layer 16 between the first conductive layer 15 and the second conductive layer 17; a planarization layer 18 between the second conductive layer 17 and the third conductive layer 190; and a passivation layer 20 between the third conductive layer 190 and the fourth conductive layer 210. It should be noted that these insulation layers may include a single film layer structure or a plurality of film layer structures, which is not specifically limited in embodiments of the present disclosure.

For example, the array substrate 1 may include a first alignment layer 22 on a side of the fourth conductive layer 210 away from the first base substrate. Accordingly, the opposite substrate 7 may include a second alignment layer 74 on a side of the second substrate 70 facing the liquid crystal layer.

For example, at least one thin film transistor T includes an active layer ACT, a control electrode TG, a first electrode TS, and a second electrode TD. The active layer ACT is located in the semiconductor layer 13, the control electrode TG is located in the first conductive layer 15, the first electrode TS and the second electrode TD are located in the second conductive layer 17, one of the pixel electrode 21 and the common electrode 19 is located in the third conductive layer 190, and the other of the pixel electrode 21 and the common electrode 19 is located in the fourth conductive layer 210. For example, the common electrode 19 may be located in the third conductive layer 190, and the pixel electrode 21 may be located in the fourth conductive layer 210.

For example, the plurality of pixel units P may be arranged in an array in the first direction X and the second direction Y intersecting with the first direction X. At least one pixel unit P may include a plurality of sub-pixels SP, which may display different colors through corresponding color filters. For example, the plurality of sub-pixels SP in the pixel unit P may include a first sub-pixel, a second sub-pixel, and a third sub-pixel. The first sub-pixel may be matched with a red color filter to display red light, the second sub-pixel may be matched with a green color filter to display green light, and the third sub-pixel may be matched with a blue color filter to display blue light.

For example, at least one pixel unit P may include a pixel driving circuit, and for example, at least one sub-pixel SP may include a pixel driving circuit. The pixel driving circuit may include at least one thin film transistor T. The pixel driving circuit is connected to the data line DL and the gate line GL. Under a control of signals transmitted by the gate line GL and the data line DL, the pixel driving circuit may selectively apply a corresponding driving voltage to at least one of the common electrode 19 or the pixel electrode 21, thereby forming an electric field between the common electrode 19 and the pixel electrode 21 of the sub-pixel SP.

Referring to FIG. 3, a plurality of gate lines GL extend in the first direction X, and at least part of the gate line GL that overlaps with the semiconductor layer 13 forms the control electrode TG of the thin film transistor.

A plurality of data lines DL extend in the second direction Y. For example, one data line DL is electrically connected to the pixel driving circuits of a plurality of sub-pixels in a column of sub-pixels SP. Specifically, the data line DL is electrically connected to the first electrode TS of the thin film transistor through a first via hole VH1.

A plurality of touch signal lines TL extend in the second direction Y. For example, one touch signal line TL is electrically connected to common electrodes 19 of a plurality of sub-pixels in three columns of sub-pixels SP.

In embodiments of the present disclosure, the plurality of touch signal lines TL and the plurality of data lines DL are structures in a same layer, and the plurality of touch signal lines TL extend in an extension direction of the plurality of data lines DL. By providing the touch signal lines in the same layer as the data lines, it is convenient to arrange the touch signal lines.

The array substrate 1 may include a conductive adapter 23 in the second conductive layer 17. The pixel electrode 21 of the sub-pixel SP may be electrically connected to a part of the conductive adapter 23 through a second via hole VH2, and another part of the conductive adapter 23 may be electrically connected to the second electrode TD of the thin film transistor through a third via hole VH3. In this way, the pixel electrode of the sub-pixel may be electrically connected to the second electrode of the thin film transistor.

When a valid level signal is provided on the gate line GL, the thin film transistor T is turned on, and the first electrode TS and the second electrode TD of the thin film transistor T are conductive through the active layer. A data signal on the data line DL may be transmitted to the pixel electrode 21, and an electric field may be formed between the pixel electrode 21 and the common electrode 19 to drive liquid crystals in the liquid crystal layer to deflect.

The electrical connection between the data line DL and the sub-pixel SP may specifically refer to an electrical connection between the data line DL and the pixel electrode 21 in the sub-pixel SP through the thin film transistor T. Then, the thin film transistor T may be used to control whether to transmit the data signal on the data line DL to the pixel electrode 21 of the corresponding sub-pixel SP, that is, the sub-pixel SP is driven by using the thin film transistor T to transmit light so as to achieve display. The thin film transistor T may be an N-type transistor or a P-type transistor, which may be determined according to actual needs and is not limited here.

For example, a plurality of slits 211 are provided on the pixel electrode 21, and at least one slit 211 includes at least one end portion. For example, each slit 211 has two end portions, including a first end portion close to an upper row of sub-pixels SP and a second end portion close to a lower row of sub-pixels SP. In embodiments of the present disclosure, the pixel electrode 21 is divided into a plurality of strip-shaped portions by the slits thereon, and the pixel electrode 21 specifically forms the electric field for driving the liquid crystals to deflect with the common electrode 19 through these strip-shaped portions.

For example, the array substrate 1 may include a light shielding portion 11 provided on the first base substrate 10. For example, the light shielding portion 11 may be located on a side of the semiconductor layer 13 facing the first base substrate 10. An orthographic projection of the light shielding portion 11 on the first base substrate 10 may overlap at least partially with an orthographic projection of the active layer ACT of the thin film transistor on the first base substrate 10.

As shown in FIG. 5, the touch display panel may include a liquid crystal layer 85, and at least one sub-pixel SP may also include a light adjustment portion 850 (such as liquid crystal molecules) in the liquid crystal layer 85. During display of the touch display panel, a driving voltage may be applied to at least one of the pixel electrode 21 or the common electrode 19 of the sub-pixel SP that needs to emit light, so that an electric field is formed between the common electrode 19 and the pixel electrode 21 of the sub-pixel SP. The light adjustment portion 850 of the sub-pixel SP is deflected under driving of the electric field, so that a light control may be achieved.

It should be noted that in some exemplary embodiments of the present disclosure, the touch display panel may be an advanced super dimension switch (ADS) type display panel, or a high-advanced dimension switch (HADS) type touch display panel. The pixel electrode and the common electrode used to generate the electric field that controls the deflection of liquid crystal molecules in the liquid crystal layer are both located on the array substrate 1. However, this is not specifically limited in embodiments of the present disclosure.

In some exemplary embodiments, a self-capacitive touch technology may be adopted for the touch display panel according to embodiments of the present disclosure, and the touch electrode may be integrated into the array substrate in an in-cell manner. Specifically, the common electrode 19 on the array substrate may be reused as a touch electrode. In a display stage, a common electrode signal is provided to the common electrode 19 through the touch signal line TL so as to achieve a display function. In a touch stage, a touch signal detected by the common electrode is transmitted using the touch signal line TL so as to achieve a touch function. In some examples, each touch sensing block may include a plurality of common electrodes that are reused as touch electrodes, such as common electrodes of dozens times dozens sub-pixels. The touch signal line connected to the touch sensing block may be connected to a driving integrated circuit in which the display function and the touch function are integrated.

In embodiments of the present disclosure, the heating element 3 is provided in the array substrate 1, and may generate heat under a driving of a drive-for-heating current. For example, when the touch display panel including the array substrate 1 is applied to a scene with a significant change in temperature (such as outdoor scene or automotive display scene), the heating element 3 may be used to heat the liquid crystals in the liquid crystal layer 85 in a case of a low ambient temperature, so as to solve technical problems such as a low response speed and a poor display effect of the liquid crystals in a low temperature environment. In embodiments of the present disclosure, the heating element 3 is integrated into the array substrate 1, and the touch sensor is also integrated into the array substrate 1, which is conducive to the lightness and thinness of the entire touch display panel.

Furthermore, in embodiments of the present disclosure, the layer where the heating element 3 is located is under the layer where the common electrode 19 reused as a touch electrode is located, that is, the heating element 3 is located on a side of the common electrode 19 facing the first base substrate 10. Specifically, the layer where the heating element 3 is located is between the semiconductor layer 13 and the third conductive layer 190.

In embodiments of the present disclosure, in an aspect, the heating element 3 is provided on the side of the semiconductor layer 13 away from the first base substrate, so that the heating element 3 is as close as possible to the liquid crystal layer to be heated, and the heating element may quickly heat the liquid crystals in the liquid crystal layer. In another aspect, the inventors found through researches that if the heating element 3 is placed above the layer where the common electrode 19 reused as the touch electrode is located, then an adverse influence may be produced on a capacitance generated during the touch stage in a case of heating by the heating element 3 during the touch stage, and the touch function may be affected. In embodiments of the present disclosure, the heating element 3 is placed under the layer where the common electrode 19 reused as the touch electrode is located, so that such adverse influence may be avoided, which is conductive to achieving a normal touch function.

In embodiments of the present disclosure, the heating element 3 may be located in at least one of the first conductive layer 15 or the second conductive layer 17. Specifically, the heating element 3 may be located in the first conductive layer 15, or the heating element 3 may be located in the second conductive layer 17, or the heating element 3 may be located in the first conductive layer 15 and the second conductive layer 17. In a case that the heating element 3 is located in the first conductive layer 15, the heating element 3 is located in the same layer as the control electrode TG of the thin film transistor, so that the heating element 3 and the control electrode TG of the thin film transistor may be formed by the same patterning process. In other words, there is no need to use an additional patterning process to form the heating element 3, so that the number of patterning processes throughout the entire process of the array substrate may be reduced. Similarly, in a case that the heating element 3 is located in the second conductive layer 17, the heating element 3 is located in the same layer as the data line DL and the first electrode TS and the second electrode TD of the thin film transistor, so that the heating element 3, the data line DL, and the first electrode TS and second electrode TD of the thin film transistor may be formed through the same patterning process. In other words, there is no need to use an additional patterning process to form the heating element 3, so that the number of patterning processes throughout the entire process of the array substrate may be reduced.

In embodiments of the present disclosure, as shown in FIG. 3, an orthographic projection of the pixel electrode 21 of the sub-pixel SP on the first base substrate 10 is oblique to the second direction Y. For example, FIG. 3 schematically shows a schematic diagram of three sub-pixels arranged in the first direction in embodiments of the present disclosure.

Referring to FIG. 3, the pixel electrode 21 of the sub-pixel SP may include two parts, one part is towards the third direction D3, and the other part is towards the fourth direction D4. The third direction D3, the fourth direction D4 and the second direction Y intersect with each other. An orthographic projection of the common electrode 19 in the sub-pixel SP on the first base substrate 10 is oblique to the second direction Y. For example, referring to FIG. 3, the common electrode 19 in the sub-pixel SP includes two parts, one part is towards the third direction D3, and the other part is towards the fourth direction D4. In this way, a dual domain electric field may be formed between the pixel electrode 21 and the common electrode 19, so that a color deviation problem of a liquid crystal display pane may be improved, and a viewing angle may be increased.

Furthermore, an orthographic projection of a signal line adjacent to the pixel electrode of the sub-pixel SP in the first direction X on the first base substrate 10 may also be oblique to the second direction Y. For example, referring to FIG. 3, the data line DL may be divided into two parts, which extend in the third direction and the fourth direction, respectively. For convenience of description, the two parts of the data line DL are referred to as a first data line portion DL1 and a second data line portion DL2, respectively. The first data line portion DL1 extends in the third direction D3, and the second data line portion DL2 extends in the fourth direction D4. Accordingly, the touch signal line TL may be divided into two parts, which extend in the third direction and the fourth direction, respectively. For convenience of description, the two parts of the touch signal line TL are referred to as a first touch line portion TL1 and a second touch line portion TL2, respectively. The first touch line portion TL1 extends in the third direction D3, and the second touch line portion TL2 extends in the fourth direction D4.

It should be noted that the "signal line adjacent to the pixel electrode of the sub-pixel SP" here may specifically mean that no other signal lines of the same type are provided between the two. For example, the data line DL being adjacent to the pixel electrode of the sub-pixel SP may specifically mean that no other data lines DL are provided between the two, and the touch signal line TL being adjacent to the pixel electrode of the sub-pixel SP may specifically mean that no other touch signal lines TL are provided between the two.

Continuing to refer to FIG. 3, the data line DL may further include a third data line portion DL3, which is located between the first data line portion DL1 and the second data line portion DL2 and used to connect the first data line portion DL1 and the second data line portion DL2. Accordingly, the touch signal line TL may further include a third touch line portion TL3, which is located between the first touch line portion TL1 and the second touch line portion TL2 and used to connect the first touch line portion TL1 and the second touch line portion TL2.

For example, an orthographic projection of the third data line portion DL3 on the first base substrate 10 is in a shape of an arrow, and an orthographic projection of the third touch line portion TL3 on the first base substrate 10 is in a shape of an arrow.

In embodiments shown in FIG. 3 to FIG. 5, the heating element 3 includes a plurality of heating wires 31. The plurality of heating wires 31 and the plurality of gate lines GL are both located in the first conductive layer 15.

For example, the plurality of gate lines GL extend in the first direction X and are spaced apart in the second direction Y. The plurality of heating wires 31 extend in the first direction X and are spaced apart in the second direction Y.

Any two of the plurality of heating wires 31 and the plurality of gate lines GL are spaced apart in the second direction Y. In some examples, the plurality of heating wires 31 and the plurality of gate lines GL are alternately arranged in the second direction Y. For example, a ratio of the number of the plurality of heating wires 31 to the number of the gate lines GL is about 1:1. By arranging the plurality of heating wires in this way, the plurality of heating wires 31 may be substantially evenly arranged on the array substrate, so that the liquid crystals in various regions of the display panel may be substantially evenly heated during the heating process, which is conducive to uniformity of heating.

In embodiments shown in FIG. 3, an orthographic projection of the heating wire 31 on the first base substrate 10 overlaps at least partially with an orthographic projection of the third data line portion DL3 on the first base substrate 10. Specifically, the orthographic projection of the heating wire 31 on the first base substrate 10 extends through the orthographic projections of a plurality of third data line portions DL3 of a row of sub-pixels SP on the first base substrate 10. The orthographic projection of the heating wire 31 on the first base substrate 10 is located between two domains. In embodiments of the present disclosure, by providing the heating wire 31 at such position, it is possible to avoid an adverse influence of the heating wire 31 on an optical effect of the liquid crystals in the display region, which is conducive to ensuring a good display effect of the display panel.

Figure 6:
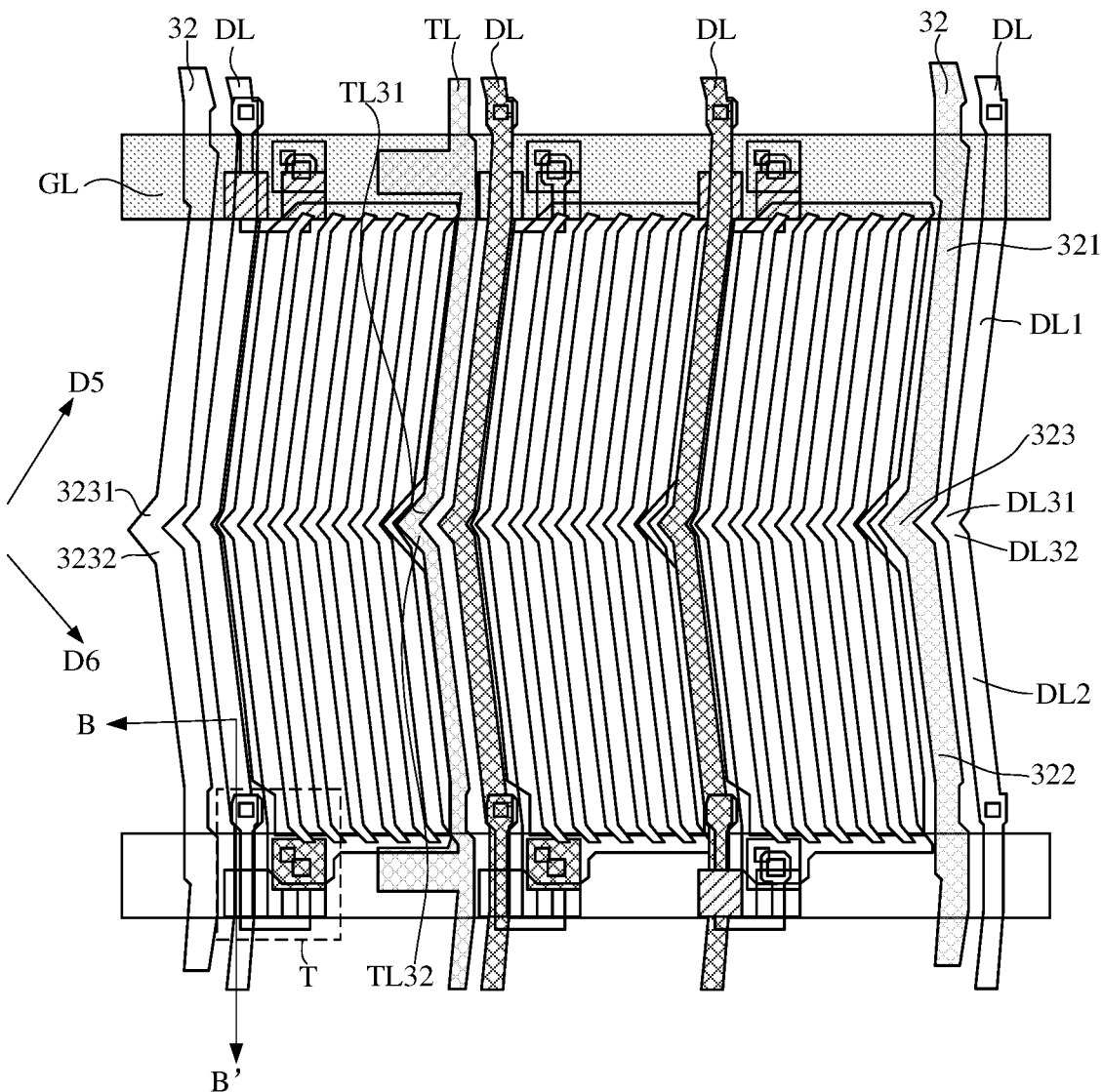
FIG. 6 shows a partially enlarged view of the array substrate at part I in FIG. 1 according to other exemplary embodiments of the present disclosure.
Figure 7:
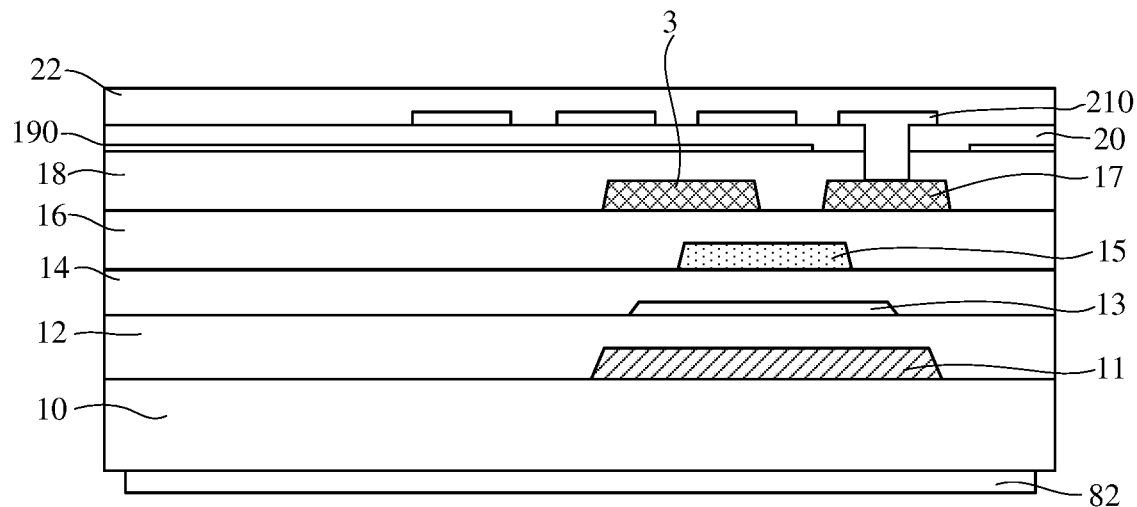
FIG. 7 shows a cross-sectional view of the array substrate taken along line BB' in FIG. 6 according to some exemplary embodiments of the present disclosure.

FIG. 6 shows a partially enlarged view of the array substrate at part I in FIG. 1 according to other exemplary embodiments of the present disclosure. FIG. 7 shows a cross-sectional view of the array substrate taken along line BB' in FIG. 6 according to some exemplary embodiments of the present disclosure. It should be noted that differences between the embodiments shown in FIG. 6 and FIG. 7 and the above embodiments will be mainly described below. For contents of the embodiments shown in FIG. 6 and FIG. 7 same as the above embodiments, details will not be repeated here, and reference may be made to the detailed descriptions of the above embodiments.

Referring to FIG. 6 and FIG. 7, the heating element 3 includes a plurality of heating wires 32, which are located in the second conductive layer 17. For example, in some examples, the plurality of heating wires 32, the plurality of data lines DL and the plurality of touch signal lines TL are all located in the second conductive layer 17.

In embodiments shown in FIG. 6 and FIG. 7, an overall extension direction of the data lines DL and the touch signal lines TL is the second direction. Accordingly, an overall extension direction of the heating wires 32 is also the second direction. It should be noted that the "overall extension direction" here indicates an overall direction of lines, and it does not exclude the possibility of local bending or tilting of the lines.

Specifically, the data line DL may include a first data line portion DL1, a second data line portion DL2, and a third data line portion DL3. The third data line portion DL3 is located between the first data line portion DL1 and the second data line portion DL2 and used to connect the first data line portion DL1 and the second data line portion DL2. The first data line portion DL1 extends in the third direction D3, and the second data line portion DL2 extends in the fourth direction D4. For example, the third data line portion DL3 includes two sub-portions DL31 and DL32. A first sub-portion DL31 of the third data line portion DL3 extends in a fifth direction D5, and a second sub-portion DL32 of the third data line portion DL3 extends in a fifth direction D6. The first sub-portion DL31 has one end connected to the first data line portion DL1, the second sub-portion DL32 has one end connected to the second data line portion DL2, and the other end of the first sub-portion DL31 is connected to the other end of the second sub-portion DL32. An orthographic projection of the third data line portion DL3 on the first base substrate 10 is in a shape of an arrow, and an endpoint at a connection between the first sub-portion DL31 and the second sub-portion DL32 is a vertex of the arrow.

The touch signal line TL extends substantially parallel to the data line DL. The touch signal line TL may include a first touch line portion TL1, a second touch line portion TL2, and a third touch line portion TL3. The third touch line portion TL3 is located between the first touch line portion TL1 and the second touch line portion TL2 and used to connect the first touch line portion TL1 and the second touch line portion TL2. The first touch line portion TL1 extends in the third direction D3, and the second touch line portion TL2 extends in the fourth direction D4. For example, the third touch line portion TL3 includes two sub-portions TL31 and TL32. A first sub-portion TL31 of the third touch line portion TL3 extends in the fifth direction D5, and the second sub-portion TL32 of the third touch line portion TL3 extends in the fifth direction D6. The first sub-portion TL31 has one end connected to the first touch line portion TL1, the second sub-portion TL32 has one end connected to the second touch line portion TL2, and the other end of the first sub-portion TL31 is connected to the other end of the second sub-portion TL32. An orthographic projection of the third touch line portion TL3 on the first base substrate 10 is in a shape of an arrow, and en endpoint at a connection between the first sub-portion TL31 and the second sub-portion TL32 is a vertex of the arrow.

The heating wire 32 extends substantially parallel to the data line DL. The heating wire 32 may include a first heating wire portion 321, a second heating wire portion 322, and a third heating wire portion 323. The third heating wire portion 323 is located between the first heating wire portion 321 and the second heating wire portion 322 and used to connect the first heating wire portion 321 and the second heating wire portion 322. The first heating wire portion 321 extends in the third direction D3, and the second heating wire portion 322 extends in the fourth direction D4. For example, the third heating wire portion 323 includes two sub-portions 3231 and 3232. A first sub-portion 3231 of the third heating wire portion 323 extends in the fifth direction D5, and a second sub-portion 3232 of the third heating wire portion 323 extends in the fifth direction D6. The first sub-portion 3231 has one end connected to the first heating wire portion 321, the second sub-portion 3232 has one end connected to the second heating wire portion 322, and the other end of the first sub-portion 3231 is connected to the other end of the second sub-portion 3232. An orthographic projection of the third heating wire portion 323 on the first base substrate 10 is in a shape of an arrow, and an endpoint at a connection between the first sub-portion 3231 and the second sub-portion 3232 is a vertex of the arrow.

Continuing to refer to FIG. 6, the plurality of data lines DL are spaced apart in the first direction X, the plurality of heating wires 32 are spaced apart in the first direction X, and any two of the heating wires 32 and the plurality of data lines DL are spaced apart in the first direction X.

Furthermore, the plurality of touch signal lines TL are spaced apart in the first direction X. Any two of the plurality of heating wires 32, the plurality of data lines DL and the plurality of touch signal lines TL are spaced apart in the first direction X.

One pixel unit includes N sub-pixels, one data line DL is used to provide data signals to the pixel driving circuits of one column of sub-pixels SP, and one touch signal line TL is electrically connected to the touch electrodes 19 of N columns of sub-pixels SP, where N is greater than or equal to 2. For example, one pixel unit may include three sub-pixels. In the design solution of 1P1T, one data line DL is used to provide data signals to the pixel driving circuits of one column of sub-pixels SP, and one touch signal line TL is electrically connected to the touch electrodes 19 of three columns of sub-pixels SP.

In some exemplary embodiments, as shown in FIG. 6, one pixel unit is provided with one heating wire 32, that is, the ratio of the number of data lines DL to the number of heating wires 32 is about N:1, for example, 3:1. In other words, N data lines DL and/or one touch signal line TL are/is arranged in the first direction X between any two adjacent heating wires 32 among the plurality of heating wires 32. For example, in embodiments shown in FIG. 6, three data lines DL and one touch signal line TL are arranged in the first direction X between two adjacent heating wires 32.

For example, with reference to FIG. 6, one pixel unit P may include three sub-pixels SP arranged in the first direction X. Three data lines DL respectively provide data signals to the pixel driving circuits of the three sub-pixels SP of the pixel unit P, that is, the three data lines DL are electrically connected to the pixel driving circuits of the three sub-pixels SP of the pixel unit P, respectively. In the pixel unit, a touch signal line TL is adjacent to one of the three data lines DL, and a heating wire 32 is adjacent to another of the three data lines DL. At most two longitudinally extending conductive elements are provided in a region between the pixel electrodes of two adjacent sub-pixels. For example, one data line DL and one heating wire 32 may be provided, or one data line DL and one touch signal line TL may be provided, or one data line may be provided. In embodiments shown in FIG. 6, "one heating wire and one data line, one touch signal line and one data line, and one data line" are alternately arranged in cycles. Such design is conducive to a rational arrangement of data lines, touch signal lines and heating wires. Moreover, by arranging the plurality of heating wires in this way, the plurality of heating wires 32 may be substantially evenly arranged on the array substrate, so that the liquid crystals in various regions of the display panel may be substantially evenly heated during the heating process, which is conducive to uniformity of heating.

In embodiments of the present disclosure, the heating element 3 may include a plurality of heating wires 31, and the plurality of heating wires 31 may be located in the first conductive layer 15, that is, all of the heating wires 31 are located in the first conductive layer 15, and they are located in the same layer as the gate lines GL. In this case, the extension direction of the heating wires 31 is the first direction, that is, the plurality of heating wires 31 extend substantially parallel to the plurality of gate lines GL. Alternatively, in embodiments of the present disclosure, the heating element 3 may include a plurality of heating wires 32, and the plurality of heating wires 32 may be located in the second conductive layer 17, that is, all of the heating wires 32 are located in the second conductive layer 17, and they are located in the same layer as the data lines DL. In this case, the overall extension direction of the heating wires 32 is the second direction, that is, the plurality of heating wires 32 extend substantially parallel to the plurality of data lines DL.

Optionally, in other exemplary embodiments of the present disclosure, the heating element 3 may include a plurality of heating wires, at least one of the plurality of heating wires is located in the first conductive layer 15, and at least another of the plurality of heating wires is located in the second conductive layer 17. The heating element 3 may include a heating wire 31 located in the first conductive layer 15 and a heating wire 32 located in the second conductive layer 17.

Figure 8A:
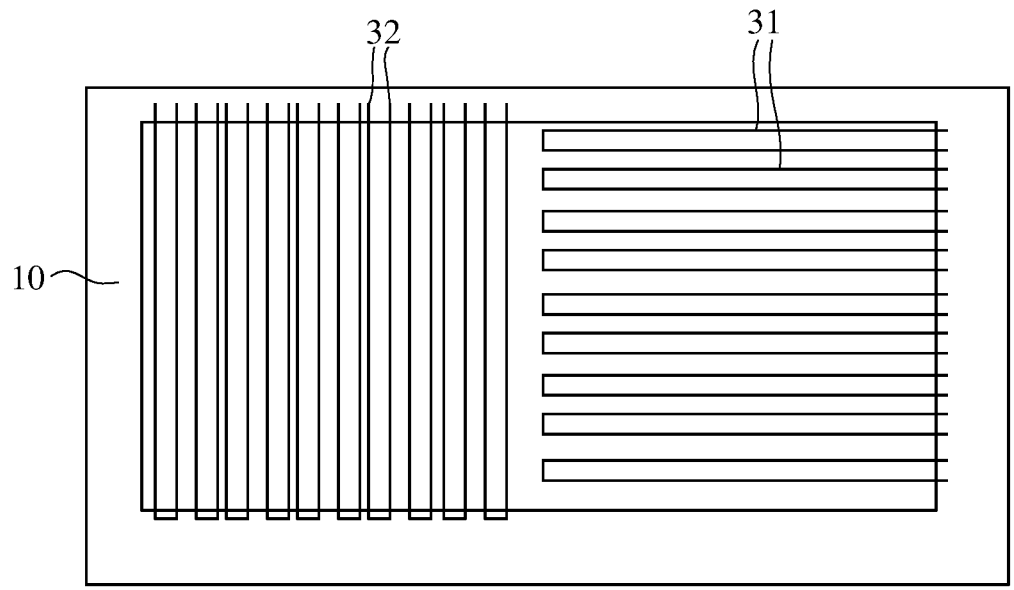
FIG. 8A to FIG. 8C schematically show various arrangements of a heating element including heating wires in a first conductive layer and heating wires in a second conductive layer.
Figure 8B:
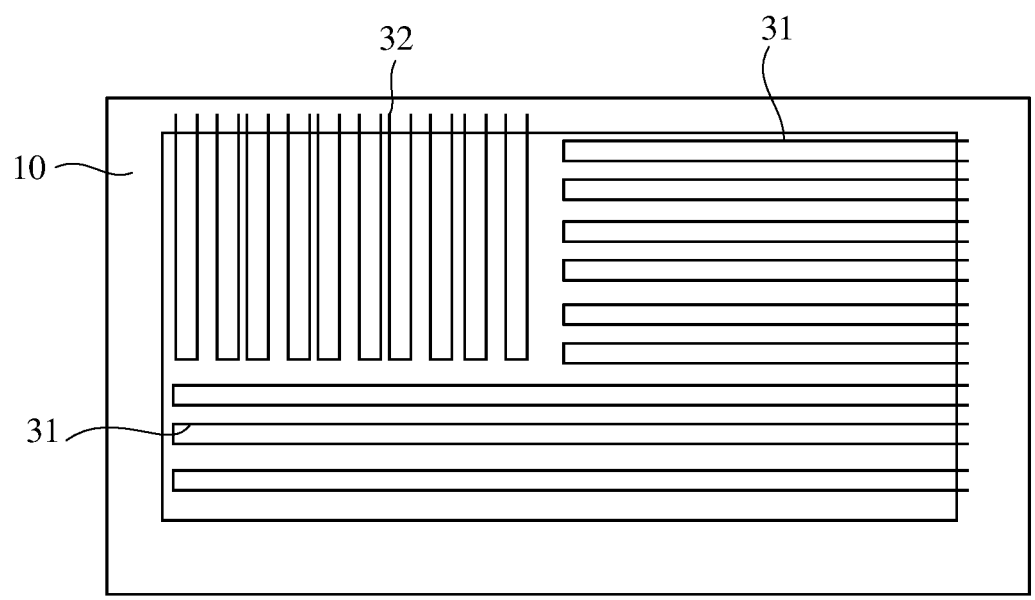
Figure 8C:
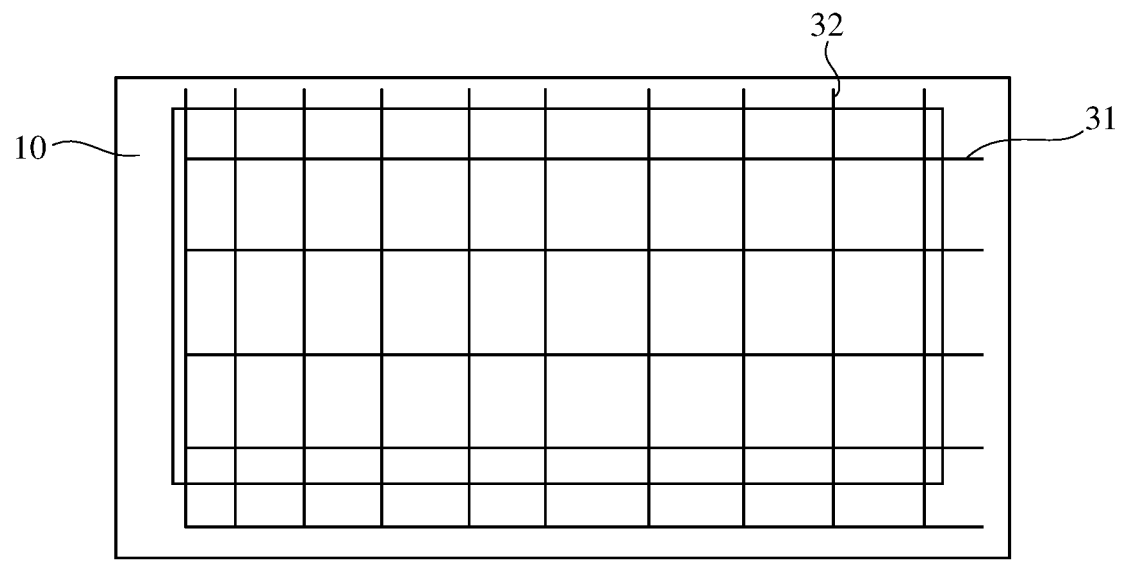

FIG. 8A to FIG. 8C schematically show various arrangements of a heating element including heating wires in the first conductive layer and heating wires in the second conductive layer. Referring to FIG. 8A, the heating wires 32 in the second conductive layer 17 extend from the third side to the fourth side of the array substrate, and the heating wires 31 in the first conductive layer 15 extend from the first side of the array substrate to a region of the display region of the array substrate. An orthographic projection of the heating wires 32 on the first base substrate 10 does not overlap with an orthographic projection of the heating wires 31 on the first base substrate 10. Referring to FIG. 8B, the heating wires 32 in the second conductive layer 17 extend from the fourth side of the array substrate to a region of the display region, at least one of the heating wires 31 in the first conductive layer 15 extends from the first side of the array substrate to a region of the display region of the array substrate, and at least another of the heating wires 31 in the first conductive layer 15 extends from the first side of the array substrate to the second side of the array substrate. An orthographic projection of the heating wires 32 on the first base substrate 10 does not overlap with an orthographic projection of the heating wires 31 on the first base substrate 10. Referring to FIG. 8C, the heating wires 32 in the second conductive layer 17 extend from the third side to the fourth side of the array substrate, and the heating wires 31 in the first conductive layer 15 extend from the first side of the array substrate to the second side of the array substrate. An orthographic projection of the heating wires 32 on the first base substrate 10 overlaps at least partially with an orthographic projection of the heating wires 31 on the first base substrate 10. The orthographic projection of the heating wires 32 on the first base substrate 10 and the orthographic projection of the heating wires 31 on the first base substrate 10 form a network structure.

In such embodiments, the heating wires are arranged in multiple conductive layers, so that a density of the heating wires may be increased, and the liquid crystals in various regions of the display panel may be heated quickly, which is conductive to improving a heating rate.

Figure 9A:
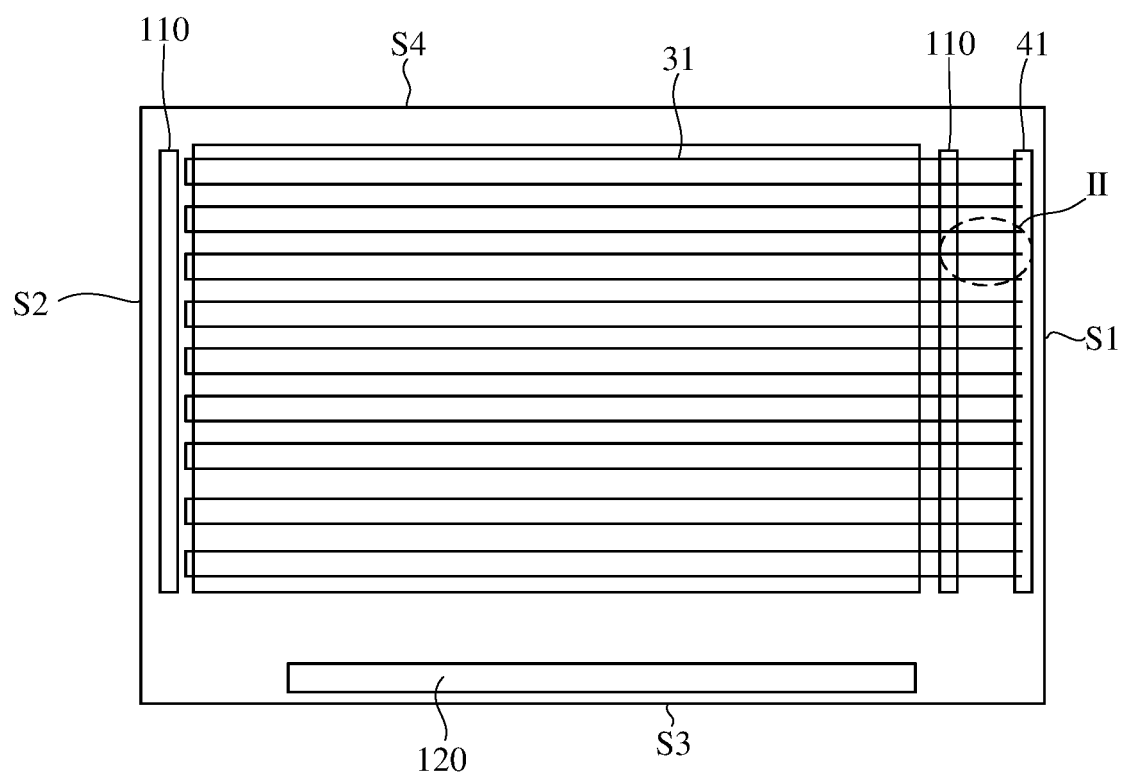
FIG. 9A to FIG. 9C schematically show positional relationships between a heating element and a heating element binding region according to some exemplary embodiments of the present disclosure.
Figure 9B:
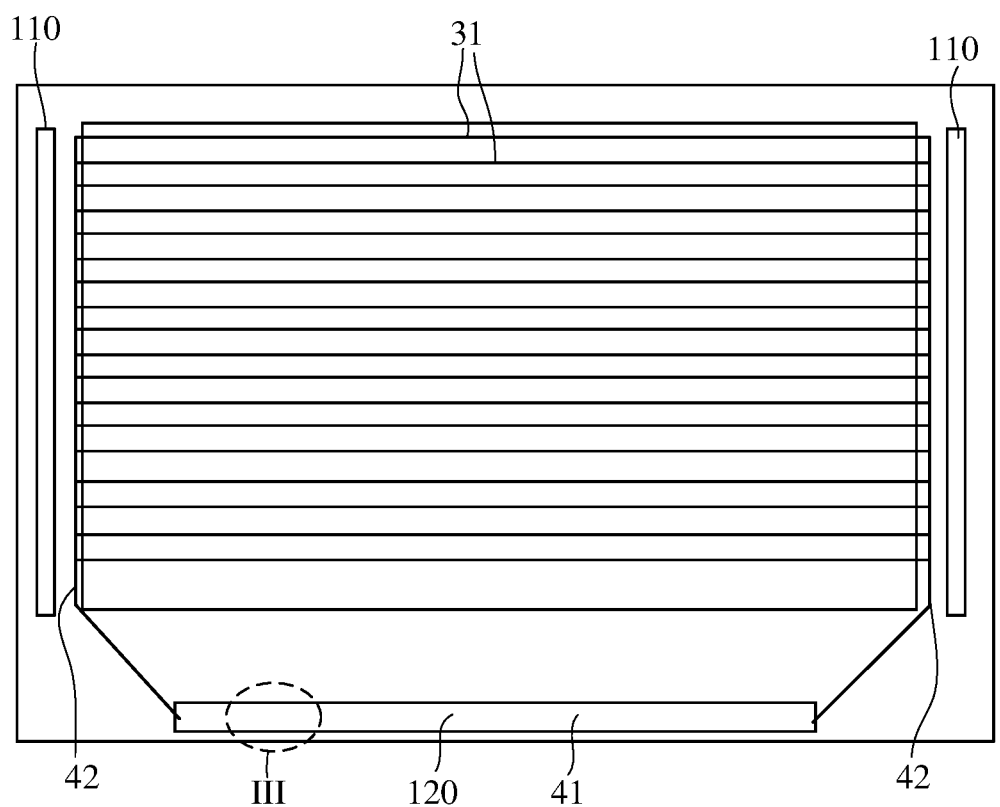
Figure 9C:
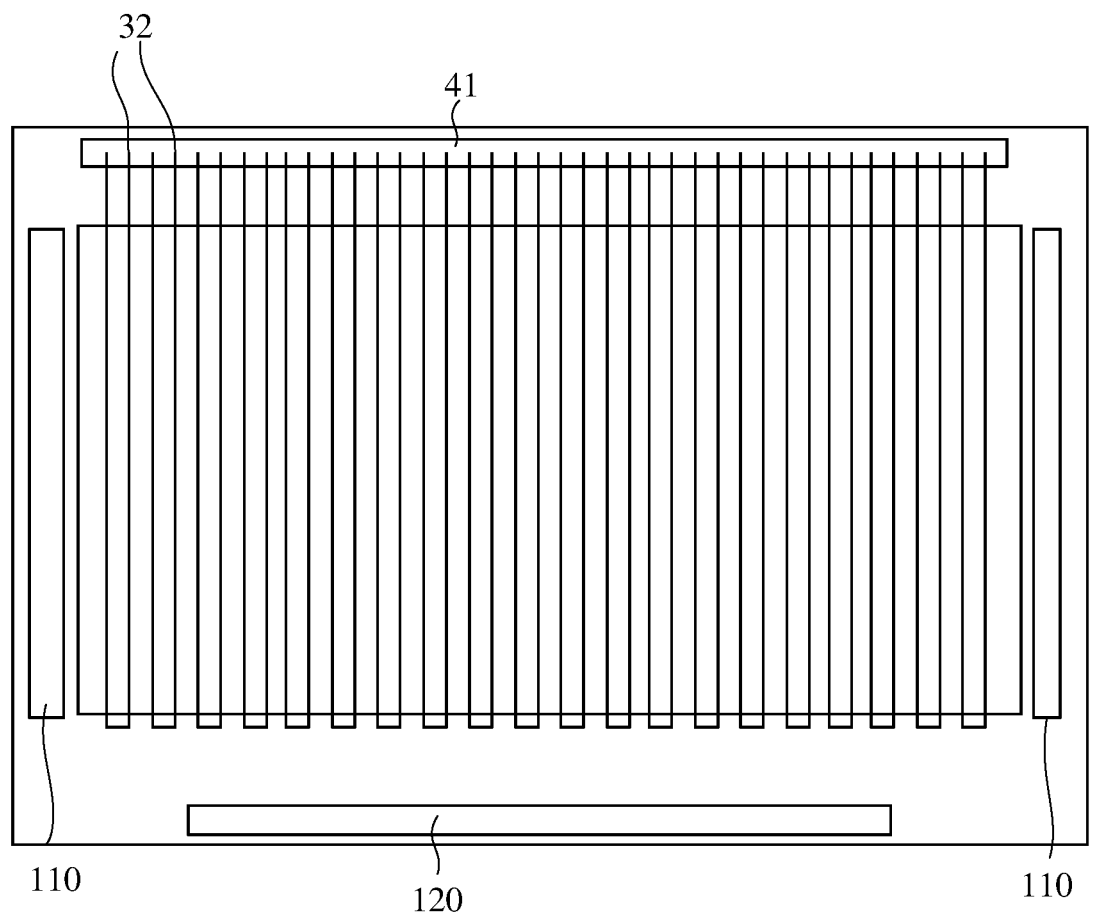

Furthermore, in embodiments of the present disclosure, the array substrate may include a heating element binding region 41 in the peripheral region NA. FIG. 9A to FIG. 9C schematically show positional relationships between the heating element and the heating element binding region according to some exemplary embodiments of the present disclosure, respectively.

Referring to FIG. 9A, the heating element 3 may include a plurality of heating wires 31 in the first conductive layer 15, the heating element binding region 41 is located on a side of the gate driving circuit 110 away from the display region AA, and the plurality of heating wires 31 extend to the heating element binding region 41. For example, in embodiments shown in FIG. 9A, the heating element binding region 41 is located on the first side S1 of the array substrate, and on a side of the gate driving circuit 110 away from the display region AA. The plurality of heating wires 31 extend from the first side S1 to the second side S2 of the array substrate, and one end of each heating wire 31 is electrically connected to a pad in the heating element binding region 41.

Figure 10:
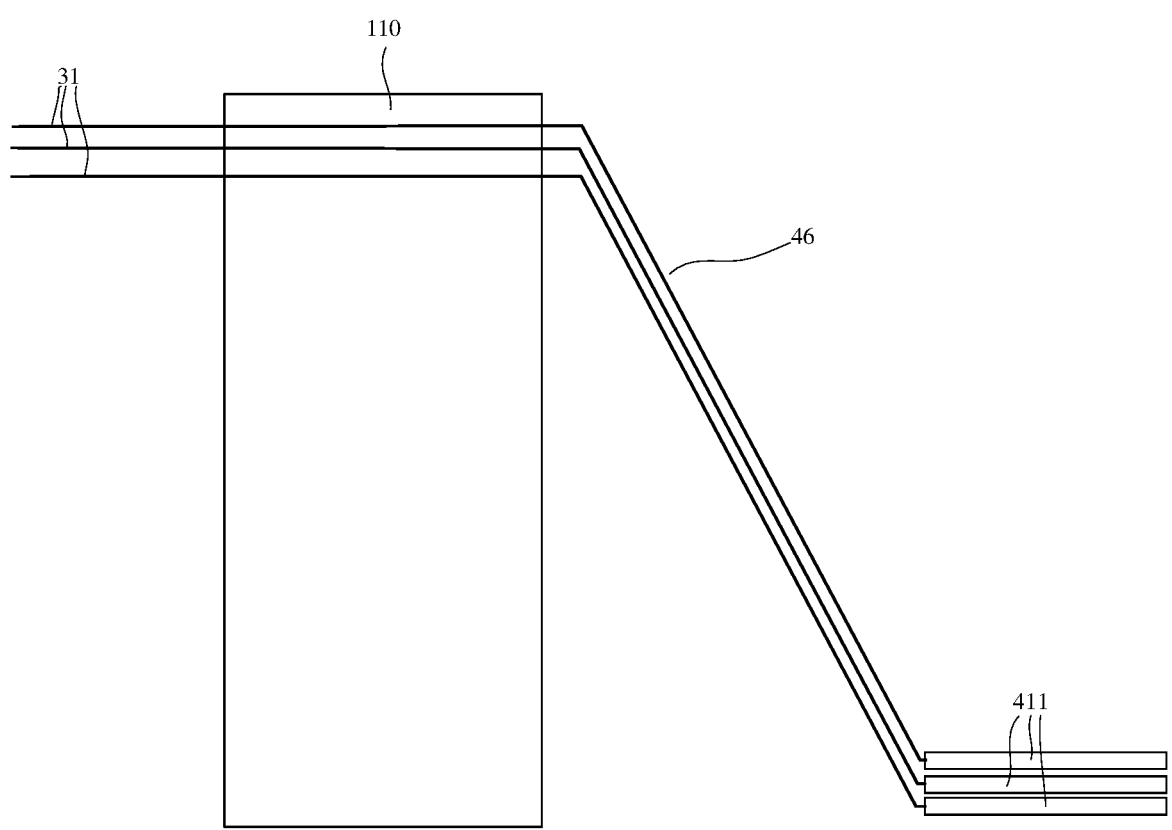
FIG. 10 shows a partially enlarged view of the array substrate at part II in FIG. 9A according to some exemplary embodiments of the present disclosure.

FIG. 10 shows a partially enlarged view of the array substrate at part II in FIG. 9A according to some exemplary embodiments of the present disclosure. Referring to FIG. 9A and FIG. 10, the array substrate may include a fan out region 46 in the peripheral region NA. The fan out region 46 is located on a side of the gate driving circuit 110 away from the display region AA. For example, the fan out region 46 may be located on the first side of the array substrate, specifically between the gate driving circuit 110 and the heating element binding region 41. The heating wire 31 extends from the display region AA towards the first side S1. Specifically, the heating wire 31 extends sequentially through a region where the gate driving circuit 110 is located and the fan out region 46, and then extends to the heating element binding region 41, so that one end of the heating wire 31 is electrically connected to a pad 411 in the heating element binding region 41.

The part of the heating wire 31 in the fan out region 46 is oblique to the part of the heating wire 31 in the region where the gate driving circuit 110 is located. For example, a vertical distance between two adjacent heating wires 31 in the fan out region 46 is less than a vertical distance between two adjacent heating wires 31 in the region where the gate driving circuit 110 is located. With a transition design of the fan out region, a size of the heating element binding region 41 may be reduced.

Referring to FIG. 9B, the heating element 3 may include a plurality of heating wires 31 in the first conductive layer 15, and the heating element binding region 41 is located on the third side S3 of the array substrate. For example, the heating element binding region 41 may be integrated into a binding region of the driver chip 120.

The array substrate may include at least one heating element lead 42 in the peripheral region NA. For example, FIG. 9B schematically shows two heating element leads 42. The plurality of heating wires 31 are electrically connected to pads in the heating element binding region 41 through the at least one heating element lead 42.

Figure 11:
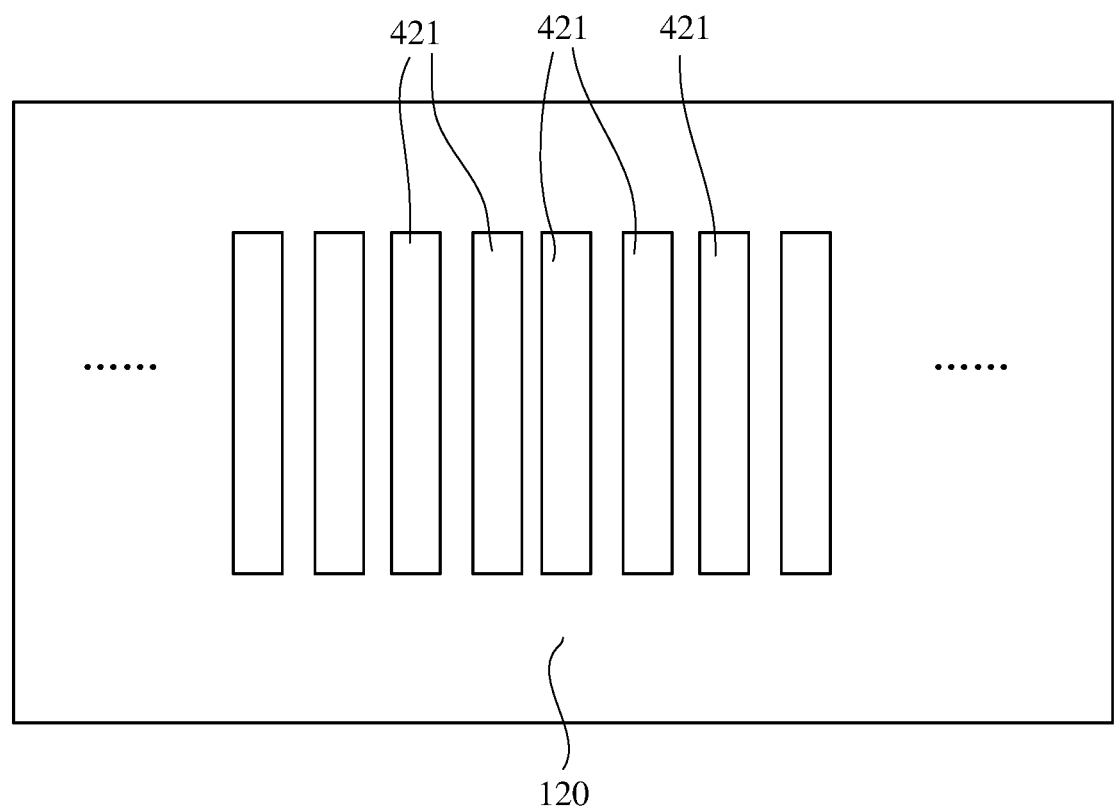
FIG. 11 shows a partially enlarged view of the array substrate at part III in FIG. 9B according to some exemplary embodiments of the present disclosure.

FIG. 11 shows a partially enlarged view of the array substrate at part III in FIG. 9B according to some exemplary embodiments of the present disclosure. Referring to FIG. 9B and FIG. 11, the heating element binding region 41 is integrated into the binding region of the driver chip 120, that is, a plurality of pads may be provided in the binding region of the driver chip 120. The plurality of pads include a pad electrically connected to the pin of the driver chip 120 and a pad 421 electrically connected to the heating element lead 42.

For example, in such embodiments, the plurality of heating wires 31 extend in the first direction X, and the heating element lead 42 extends in the second direction Y. The heating element lead 42 has one end electrically connected to one end of the heating wire 31 and the other end electrically connected to the pad 421.

In such embodiments, the heating wire 31 does not need to extend through the region where the gate driving circuit 110 is located, which is conducive to the wiring of the heating wire 31 in the peripheral region. In addition, the heating element binding region 41 is integrated into the binding region of the driver chip 120, and there is no need to provide an additional binding region.

Referring to FIG. 9C, the heating element 3 may include a plurality of heating wires 32 in the second conductive layer 17, and the heating element binding region 41 is located on the fourth side S4 of the array substrate, that is, the heating element binding region is located on a side opposite to the region where the driver chip 120 is located. The plurality of heating wires 32 substantially extend in the second direction Y, and extend from the third side S3 to the heating element binding region 41 on the fourth side S4. One end of each heating wire 32 is electrically connected to a pad in the heating element binding region 41.

In such embodiments, the heating wire 32 extends in a width direction of the array substrate, and there is no need to provide an additional lead for the heating wire, which is conductive to reducing an overall extension length of the heating wire 32 and reducing the resistance of the heating wire 32. Moreover, the heating wire 32 does not need to extend through the region where the gate driving circuit 110 is located, which is conducive to the wiring of the heating wire 32 in the peripheral region.

Figure 12:
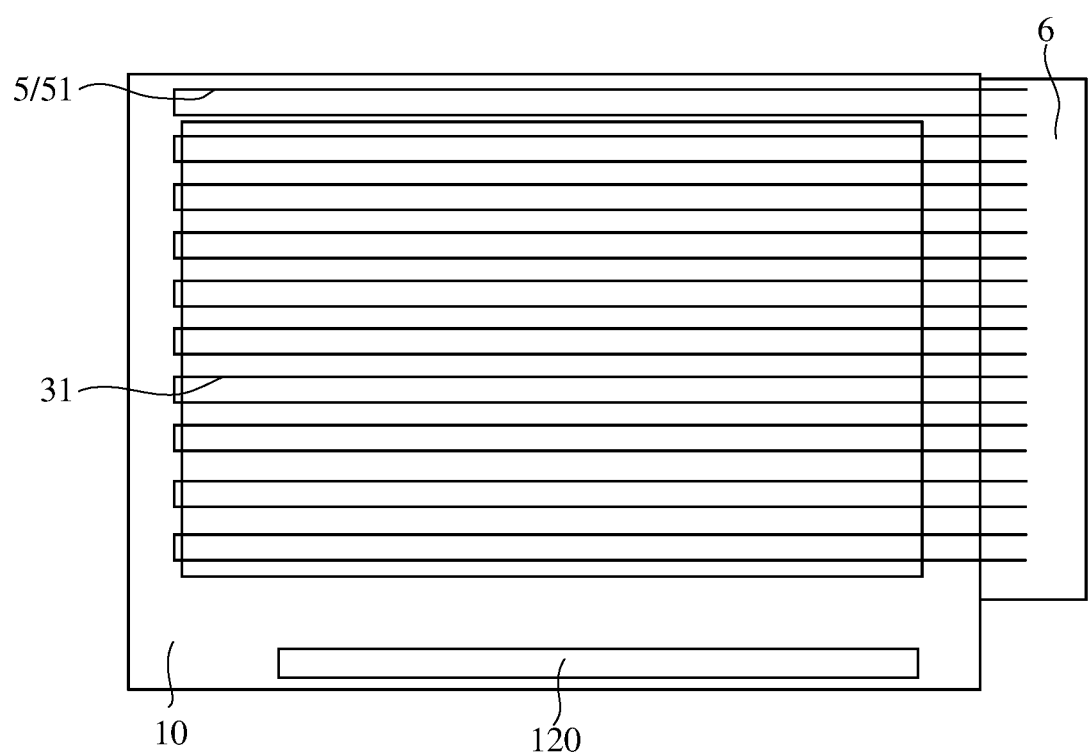
FIG. 12 shows a schematic diagram of a display device according to some exemplary embodiments of the present disclosure, in which an array substrate of the display device includes a temperature measurement element.

FIG. 12 shows a schematic diagram of a display device according to some exemplary embodiments of the present disclosure, in which the array substrate of the display device includes a temperature measurement element. Referring to FIG. 1 to FIG. 12, the array substrate may include a temperature measurement element 5 provided on the first base substrate 10, and the temperature measurement element 5 is used to sense a temperature of a region where the temperature measurement element 5 is located.

Referring to FIG. 12, the display device may include a drive-for-heating circuit board 6. The heating element 3 and the temperature measurement element 5 are electrically connected to the drive-for-heating circuit board 6. For example, the temperature measurement element 5 may sense the temperature in the region where the temperature measurement element 5 is located in the display device. The drive-for-heating circuit board 6 may control a driving current supplied to the heating element 3 according to a sensed temperature, and the heating element 3 may be used to heat the liquid crystals in the display device according to the driving current.

In some exemplary embodiments, the temperature measurement element 5 may include at least one resistance wire 51. In such embodiments, the resistance wire 51 contains a metal conductive material. Based on a characteristic of the resistance wire 51 that a resistance value changes due to a temperature influence, it is possible to sense a change in temperature through the resistance wire 51.

For example, the resistance wire 51 may be located in the same layer as the heating wire 31, that is, the resistance wire 51 may be located in the first conductive layer 15. The resistance wire 51 extends substantially parallel to the heating wire 31. In such embodiments, the resistance wire 51 and the heating wire 31 may be formed through the same patterning process, which is conductive to reducing a manufacturing difficulty of the temperature measurement element.

For another example, the resistance wire 51 may be located in the same layer as the heating wire 32, that is, the resistance wire 51 may be located in the second conductive layer 17. The resistance wire 51 extends substantially parallel to the heating wire 32. In such embodiments, the resistance wire 51 and the heating wire 32 may be formed through the same patterning process, which is conductive to reducing a manufacturing difficulty of the temperature measurement element.

Figure 14A:
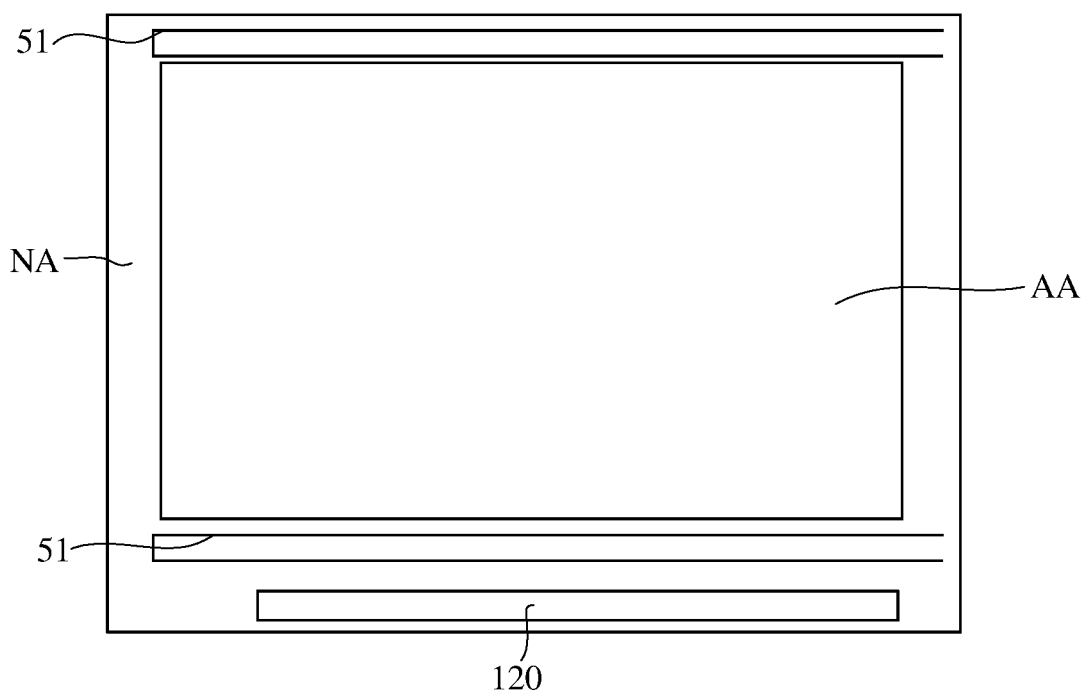
FIG. 14A to FIG. 14D schematically show arrangements of a temperature measurement element according to some exemplary embodiments of the present disclosure.

FIG. 14A to FIG. 14D schematically show arrangements of the temperature measurement element according to some exemplary embodiments of the present disclosure, respectively. Referring to FIG. 14A, the temperature measurement element 5 may include a plurality of resistance wires 51, for example, two resistance wires 51. FIG. 14A schematically shows that the two resistance wires 51 are located in the peripheral region NA, respectively on the third side S3 and the fourth side S4. The plurality of resistance wires 51 extend in the first direction X and are spaced apart in the second direction Y. Specifically, the plurality of heating wires 31, the plurality of gate lines GL and the plurality of resistance wires 51 may be located in the first conductive layer 15, and any two of the plurality of heating wires 31, the plurality of gate lines GL and the plurality of resistance wires 51 are spaced apart in the second direction Y.

Figure 14B:
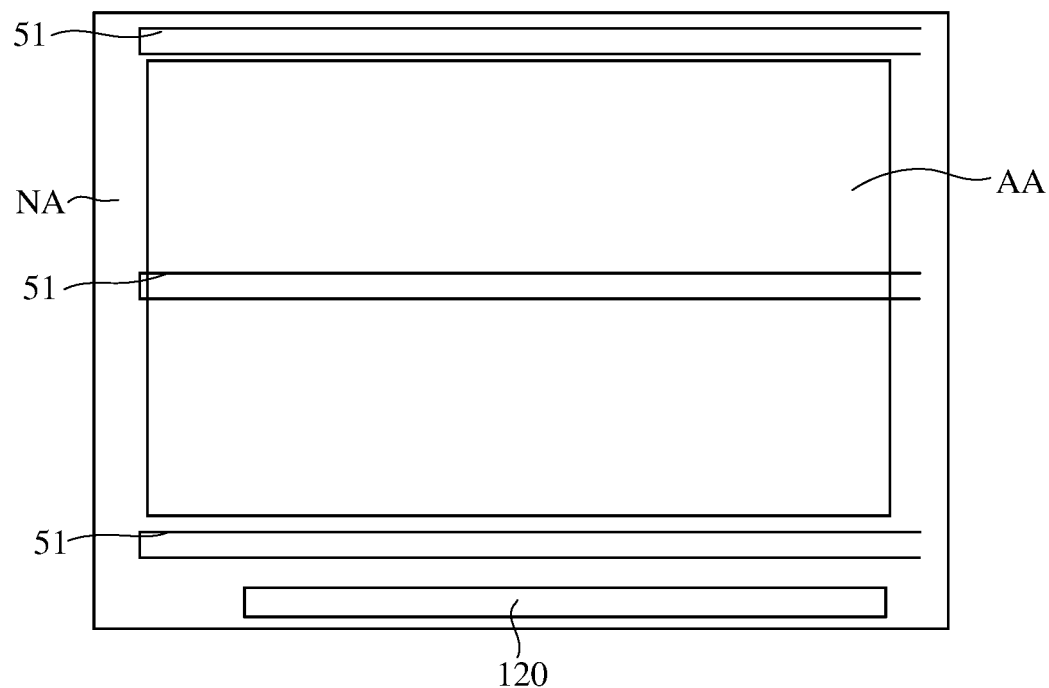

Referring to FIG. 14B, the temperature measurement element 5 may include a plurality of resistance wires 51, for example, three resistance wires 51. As shown in FIG. 14B, two resistance wires 51 are located in the peripheral region NA, respectively on the third side S3 and the fourth side S4, and the remaining resistance wire 51 extends through the display region AA. The plurality of resistance wires 51 extend in the first direction X and are spaced apart in the second direction Y. Specifically, the plurality of heating wires 31, the plurality of gate lines GL and the plurality of resistance wires 51 may be located in the first conductive layer 15, and any two of the plurality of heating wires 31, the plurality of gate lines GL and the plurality of resistance wires 51 are spaced apart in the second direction Y.

Figure 14C:
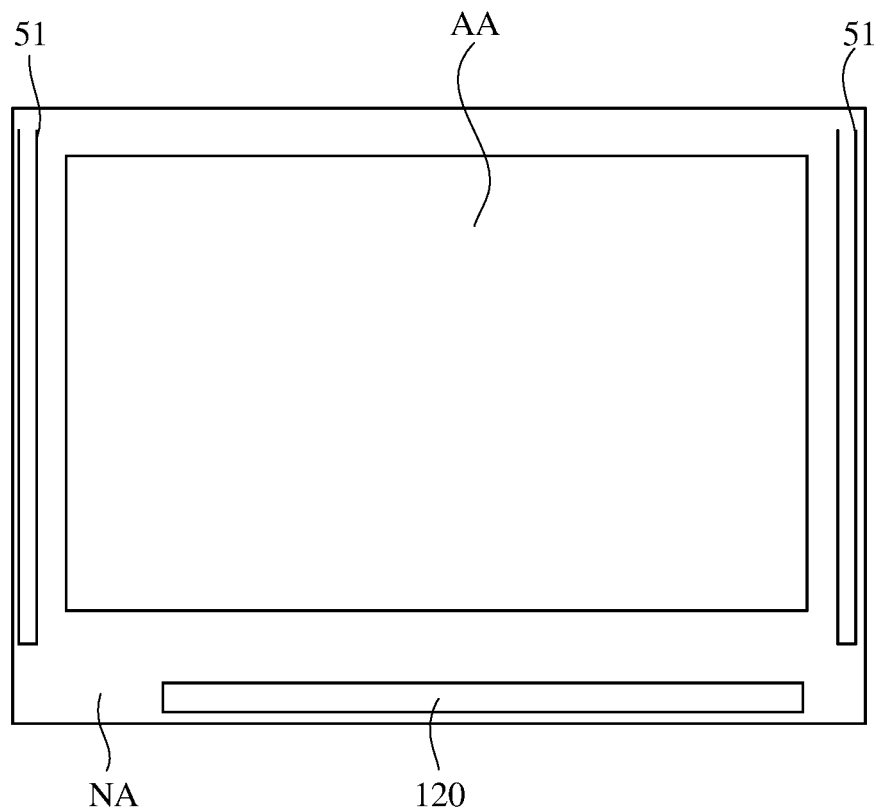

Referring to FIG. 14C, the temperature measurement element 5 may include a plurality of resistance wires 51, for example, two resistance wires 51. FIG. 14C schematically shows that the two resistance wires 51 are located in the peripheral region NA, respectively on the first side S1 and the second side S2. The plurality of resistance wires 51 substantially extend in the second direction Y and are spaced apart in the first direction X. Specifically, the plurality of heating wires 32, the plurality of data lines DL and the plurality of resistance wires 51 may be located in the second conductive layer 17, and any two of the plurality of heating wires 32, the plurality of data lines DL and the plurality of resistance wires 51 are spaced apart in the first direction X.

Figure 14D:
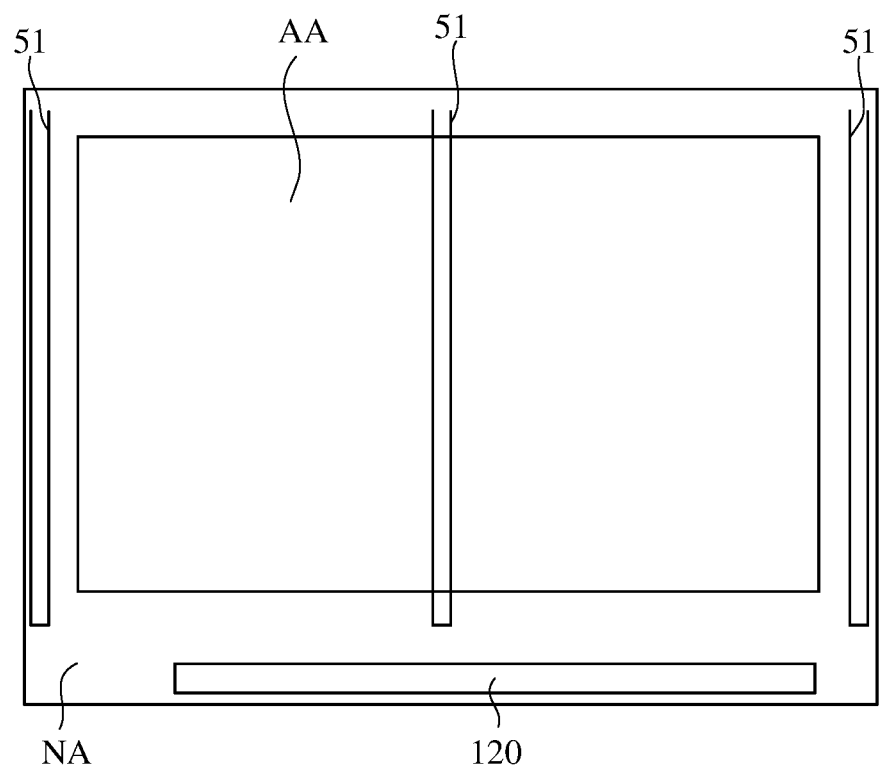

Referring to FIG. 14D, the temperature measurement element 5 may include a plurality of resistance wires 51, for example, three resistance wires 51. As shown in FIG. 14D, two resistance wires 51 are located in the peripheral region NA, respectively on the first side S1 and the second side S2, and the remaining resistance wire 51 extends through the display region AA. The plurality of resistance wires 51 substantially extend in the second direction Y and are spaced apart in the first direction X. Specifically, the plurality of heating wires 32, the plurality of data lines DL and the plurality of resistance wires 51 may be located in the second conductive layer 17, and any two of the plurality of heating wires 32, the plurality of data lines DL and the plurality of resistance wires 51 are spaced apart in the first direction X.

Figure 13:
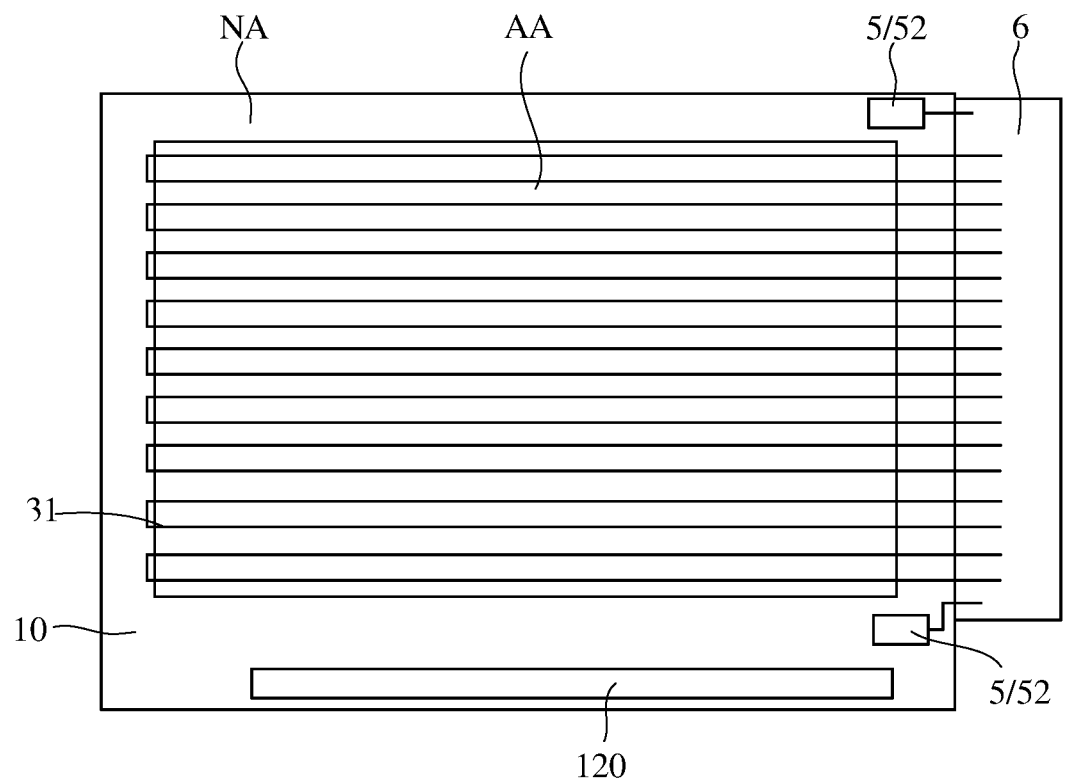
FIG. 13 shows a schematic diagram of an array substrate according to some exemplary embodiments of the present disclosure, in which the array substrate includes a temperature measurement element, and the temperature measurement element is a temperature measurement transistor.
Figure 15:
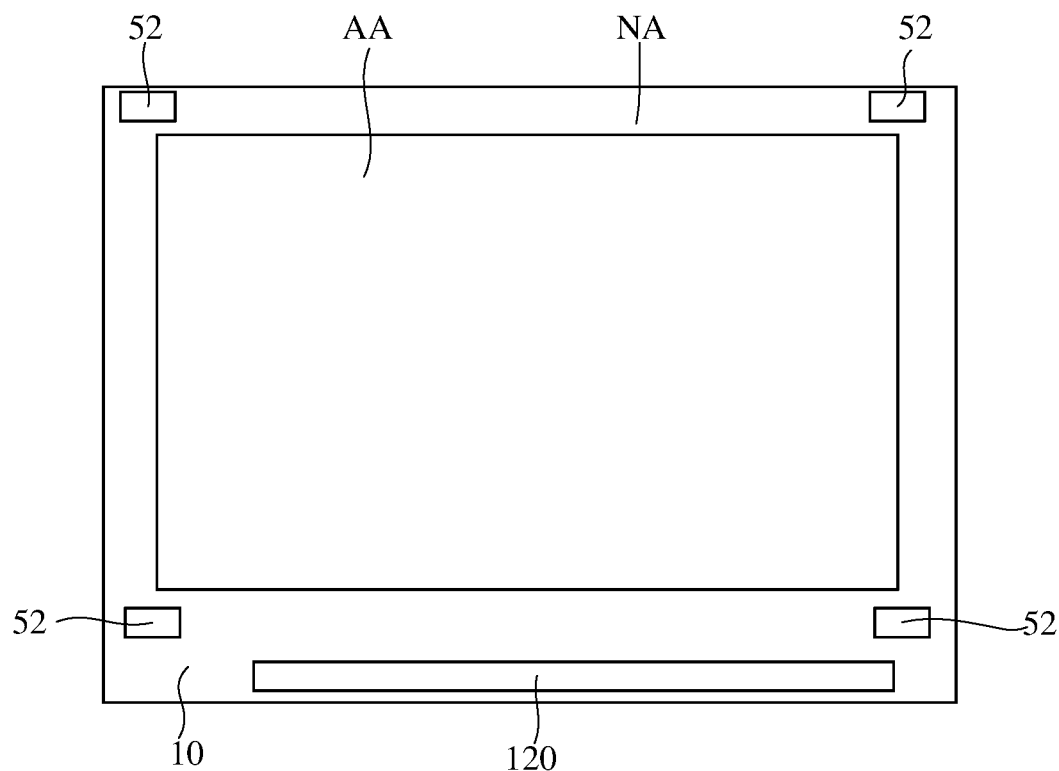
FIG. 15 schematically shows an arrangement of a temperature measurement transistor in an array substrate according to some exemplary embodiments of the present disclosure.

In some exemplary embodiments of the present disclosure, the temperature measurement element 5 may include at least one temperature measurement transistor 53. FIG. 13 shows a schematic diagram of an array substrate according to some exemplary embodiments of the present disclosure, in which the array substrate includes a temperature measurement element, and the temperature measurement element is a temperature measurement transistor. FIG. 15 schematically shows an arrangement of the temperature measurement transistor in the array substrate according to some exemplary embodiments of the present disclosure. Referring to FIG. 13, at least one (e.g., two) temperature measurement transistor 53 is located in the peripheral region NA. For example, referring to FIG. 15, the temperature measurement element 5 includes four temperature measurement transistors 53, which are respectively located at four corners of the peripheral region NA of the array substrate.

It was found through researches that for a thin film transistor, a leakage current of the transistor has a relationship with a temperature of the transistor, that is, the thin film transistor may exhibit a temperature-leakage current characteristic curve. The thin film transistor may exhibit different temperature-leakage current characteristic curves at different gate voltages. The thin film transistor may be equivalent to a resistor, a resistance value of the resistor varies with temperature, and the equivalent resistor exhibits different temperature-resistance curves under different gate voltages. Based on this operating principle, it is possible to measure the temperature of the temperature measurement transistor 53 by measuring the leakage current of the temperature measurement transistor 53, so as to achieve a purpose of sensing temperature.

In such embodiments, a position of the temperature measurement transistor may be flexibly determined to perform a regional temperature measurement so as to achieve a regional control of the array substrate. In addition, it is possible to control the equivalent resistance of the transistor by controlling the gate voltage of the thin film transistor, so that the temperature may be sensed conveniently.

Figure 16A:
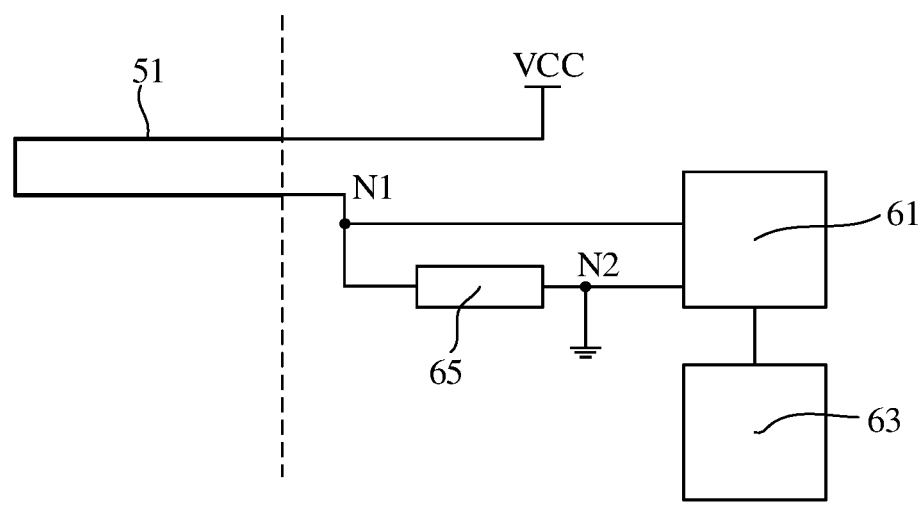
FIG. 16A schematically shows an equivalent circuit diagram when a temperature measurement element is a resistance wire.

FIG. 16A schematically shows an equivalent circuit diagram when the temperature measurement element is a resistance wire. Referring to FIG. 16A, the drive-for-heating circuit board 6 may include: a temperature acquisition circuit 61 electrically connected to the temperature measurement element (such as the resistance wire 51); a divided resistor 65; a driving and controlling circuit 63 electrically connected to the temperature acquisition circuit 61 and used to generate a drive-for-heating current according to a temperature acquired by the temperature acquisition circuit 61.

Specifically, the resistance wire 51 has one end electrically connected to a first voltage terminal VCC, and the other end electrically connected to a node N1. The divided resistor 65 has one end electrically connected to the node N1, and the other end electrically connected to a node N2. The temperature acquisition circuit 61 has a pin electrically connected to the node N1, another pin electrically connected to the node N2, and still another pin electrically connected to the driving and controlling circuit 63. For example, the node N2 may be grounded.

In embodiments shown in FIG. 16A, the resistance value of the resistance wire 51 changes with temperature, resulting in a current flowing through the divided resistor 65 changing with temperature. Accordingly, a voltage across the divided resistor 65, i.e., a voltage between the node N1 and the node N2, changes with temperature. The temperature acquisition circuit 61 may acquire the voltage across the divided resistor 65 and convert the acquired voltage into a digital signal, and send the digital signal to the driving and controlling circuit 63. In some examples, the temperature acquisition circuit 61 may include a voltage acquisition and analog-to-digital conversion chip. The driving and controlling circuit 63 may determine the temperature sensed by the resistance wire 51 through a curve function or lookup table according to the received digital signal.

Figure 16B:
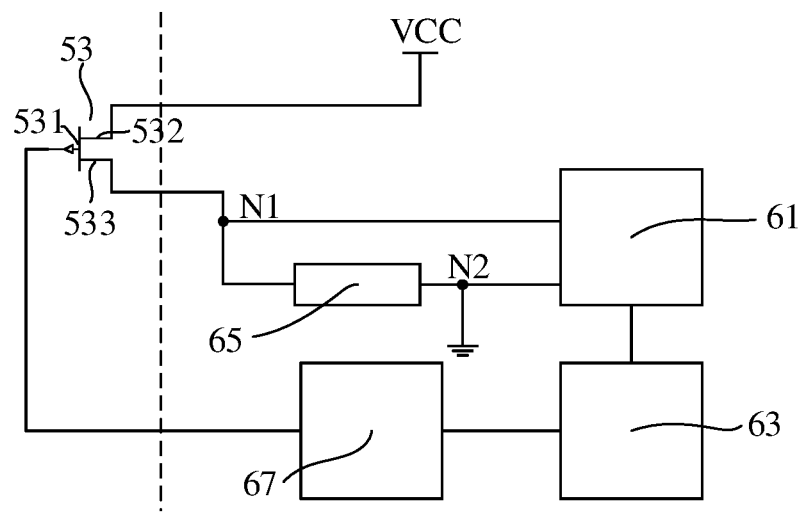
FIG. 16B schematically shows an equivalent circuit diagram when a temperature measurement element is a temperature measurement transistor.

FIG. 16B schematically shows an equivalent circuit diagram when the temperature measurement element is a temperature measurement transistor. Referring to FIG. 16B, the drive-for-heating circuit board 6 may include a temperature acquisition circuit 61 electrically connected to the temperature measurement element (such as temperature measurement transistor 53); a divided resistor 65; a driving and controlling circuit 63 electrically connected to the temperature acquisition circuit 61 and used to generate a drive-for-heating current according to the temperature acquired by the temperature acquisition circuit 61; and a voltage switching circuit 67.

Specifically, the temperature measurement transistor 53 includes a control electrode 531, a first electrode 532, and a second electrode 533. The first electrode 532 of the temperature measurement transistor 53 is electrically connected to the first voltage terminal VCC, the second electrode 533 of the temperature measurement transistor 53 is electrically connected to the node N1, and the control electrode 531 of the temperature measurement transistor 53 is electrically connected to the voltage switching circuit 67. One end of the divided resistor 65 is electrically connected to the node N1, and the other end of the divided resistor 65 is electrically connected to the node N2. A pin of the temperature acquisition circuit 61 is electrically connected to the node N1, an another pin of the temperature acquisition circuit 61 is electrically connected to the node N2, and still another pin of the temperature acquisition circuit 61 is electrically connected to the driving and controlling circuit 63. For example, the node N2 may be grounded. A pin of the driving and controlling circuit 63 is electrically connected to the voltage switching circuit 67.

Figure 17:
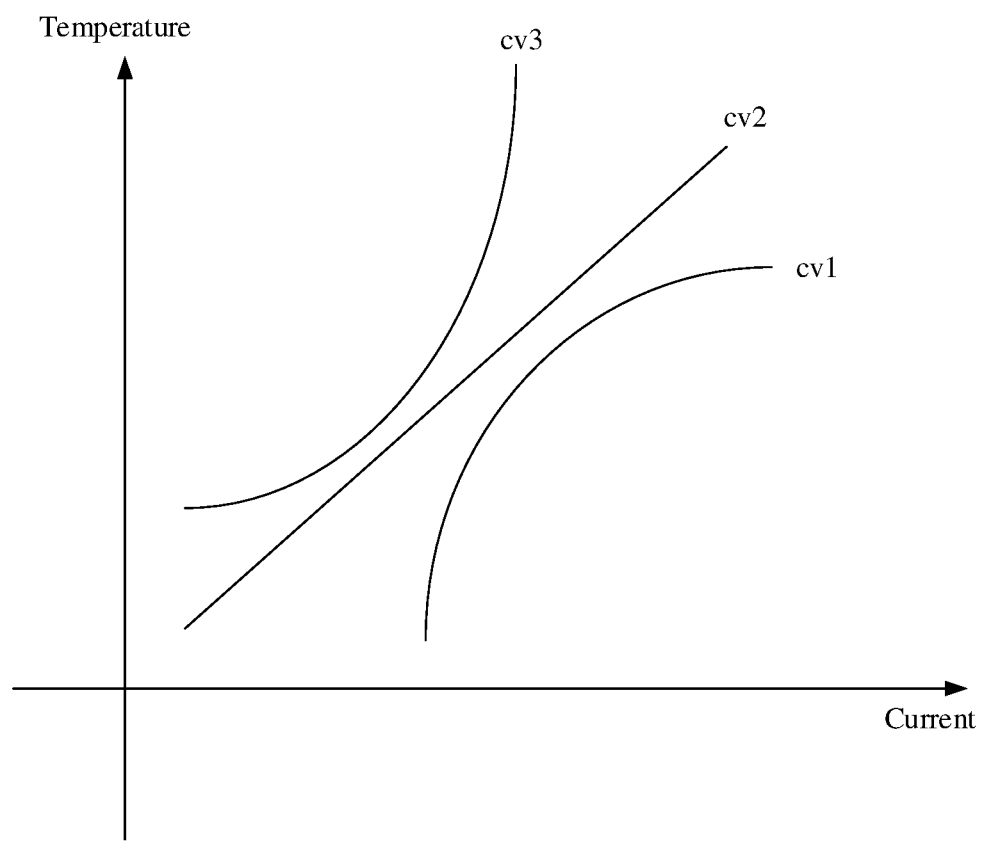
FIG. 17 schematically shows temperature-leakage current characteristic curves of a temperature measurement transistor at different gate voltages.

FIG. 17 schematically shows temperature-leakage current characteristic curves of the temperature measurement transistor at different gate voltages. In embodiments of the present disclosure, a gate voltage of the temperature measurement transistor 53 having an ideal temperature-leakage current characteristic curve may be determined according to the temperature-leakage current characteristic curves of the temperature measurement transistor 53 at different gate voltages. For example, in an example shown in FIG. 17, at different gate voltages v1, v2, and v3, the temperature measurement transistor 53 exhibits different temperature-leakage current characteristic curves cv1, cv2, and cv3. The temperature-leakage current characteristic curve cv2 indicates that under the gate voltage v2, the temperature of the temperature measurement transistor 53 varies substantially linearly with the leakage current. Therefore, it may be considered that the gate voltage v2 is the gate voltage of the temperature measurement transistor 53 having an ideal temperature-leakage current characteristic curve.

Referring to FIG. 16B and FIG. 17, it is possible to control a value of a voltage output by the voltage switching circuit 67 to be a value of the gate voltage v2. The leakage current flowing through the temperature measurement transistor 53 varies with temperature, causing the current flowing through the divided resistor 65 to change with the temperature. Accordingly, the voltage across the divided resistor 65, i.e., the voltage between the node N1 and the N2, changes with the temperature. The temperature acquisition circuit 61 may acquire the voltage across the divided resistor 65, and convert the acquired voltage into a digital signal, and send the digital signal to the driving and controlling circuit 63. The driving and controlling circuit 63 may determine the temperature sensed by the temperature measurement transistor 53 through a curve function or lookup table according to the received digital signal.

Figure 18:
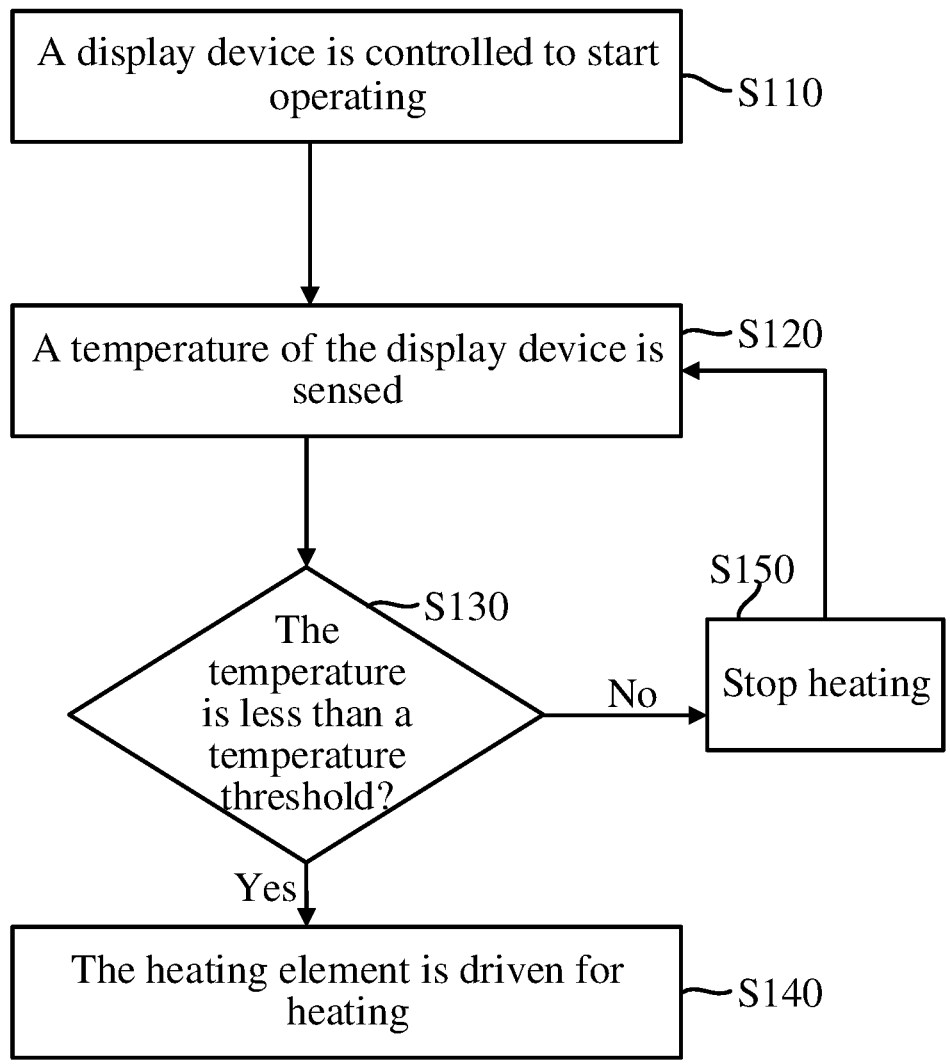
FIG. 18 shows a flowchart of a drive-for-heating method for a display device according to some exemplary embodiments of the present disclosure.
Figure 19:
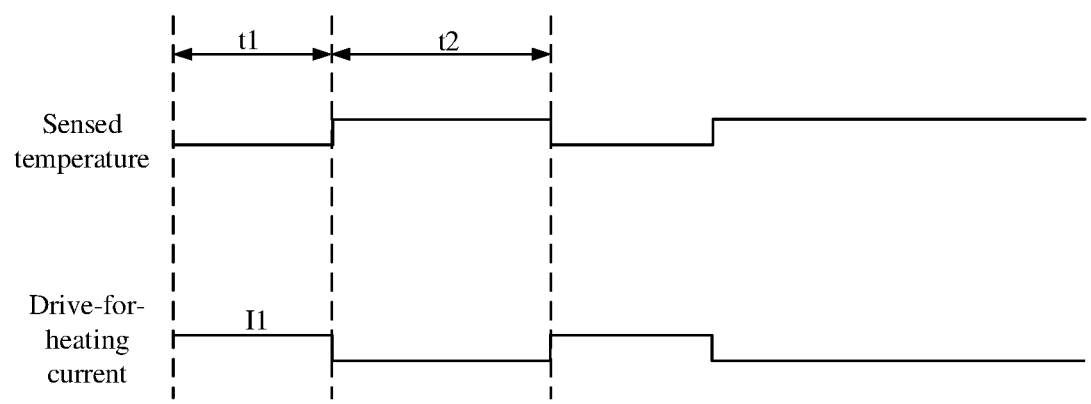
FIG. 19 shows a timing diagram corresponding to the drive-for-heating method shown in FIG. 18.

FIG. 18 shows a flowchart of a drive-for-heating method for a display device according to some exemplary embodiments of the present disclosure. FIG. 19 shows a timing diagram corresponding to the drive-for-heating method shown in FIG. 18. Referring to FIG. 18 and FIG. 19, the drive-for-heating method may include step S110 to step S150.

In step S110, a display device is controlled to start operating.

In step S120, a temperature of the display device is sensed. For example, the temperature acquisition circuit 61 may acquire the temperature of the display device at a first frequency FQ1 based on the resistance wire 51 or the temperature measurement transistor 53.

In step S130, the sensed temperature of the display device is compared with a predetermined temperature threshold. For example, it is possible to predetermine two temperature thresholds, including a first temperature threshold and a second temperature threshold. For example, the driving and controlling circuit 63 may determine the temperature sensed by the temperature measurement element 5 through a curve function or lookup table according to the received digital signal, and compare the temperature sensed by the temperature measurement element 5 with the temperature threshold.

In step S140, in response to the sensed temperature of the display device being less than the first temperature threshold, the heating element 3 is driven for heating. For example, referring to the first stage t1 in FIG. 19, the driving and controlling circuit 63 may generate a drive-for-heating current I1 corresponding to the sensed temperature, and output the drive-for-heating current I1 to the heating element 3 to drive the heating element 3 for heating.

In step S150, in response to the sensed temperature of the display device being greater than the second temperature threshold, the heating element 3 is driven to stop heating. For example, referring to the second stage t2 in FIG. 19, the driving and controlling circuit 63 may be used to drive the heating element 3 to stop heating.

In such embodiments, a direct driving is performed with the temperature as a parameter, that is, the temperature of the display device is monitored in real-time, and the display device is continuously heated in a case of a low temperature until the temperature of the display device rises to a specified temperature. Therefore, the drive-for-heating method is convenient to control.

Figure 20:
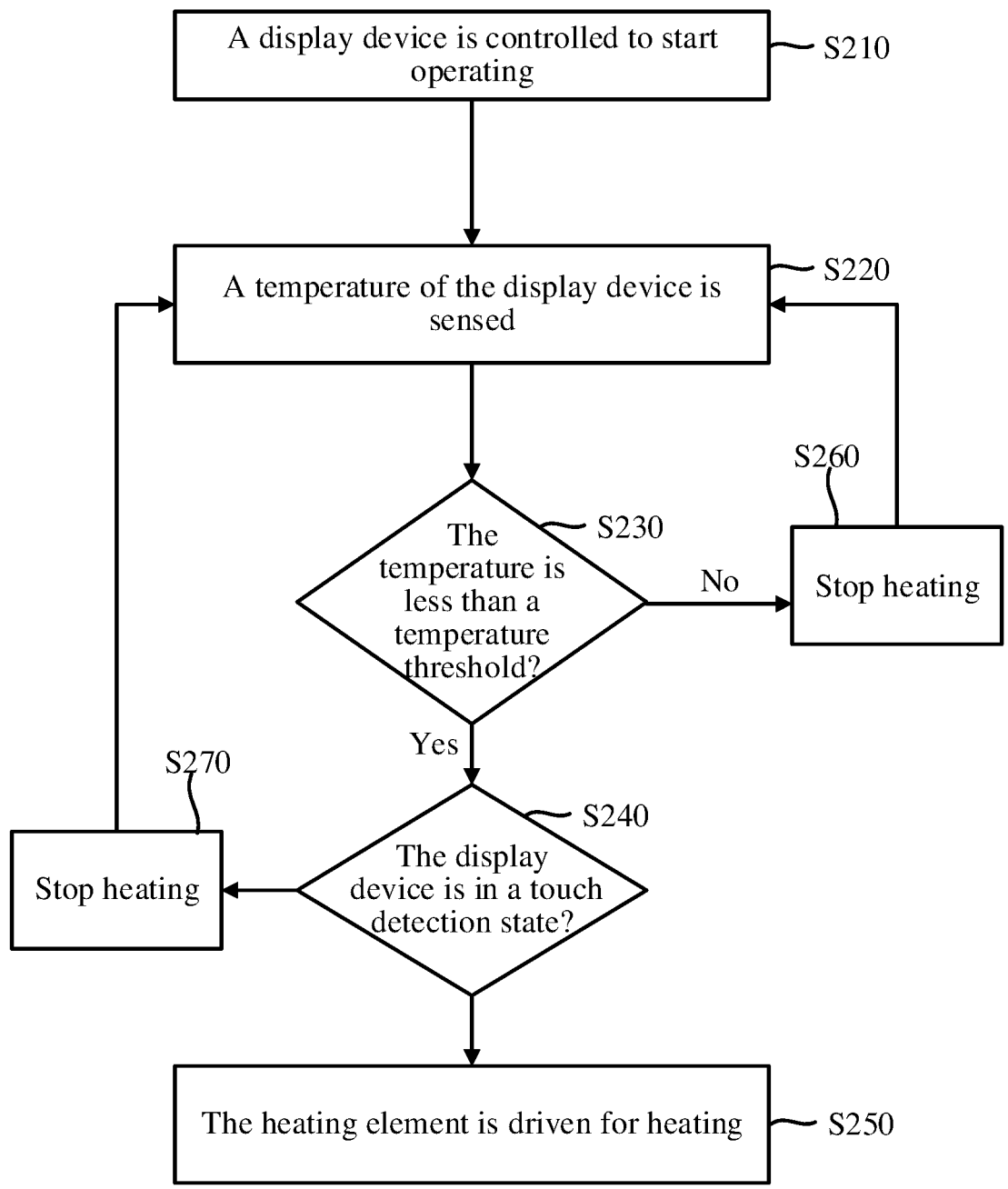
FIG. 20 shows a flowchart of a drive-for-heating method for a display device according to other exemplary embodiments of the present disclosure.
Figure 21:
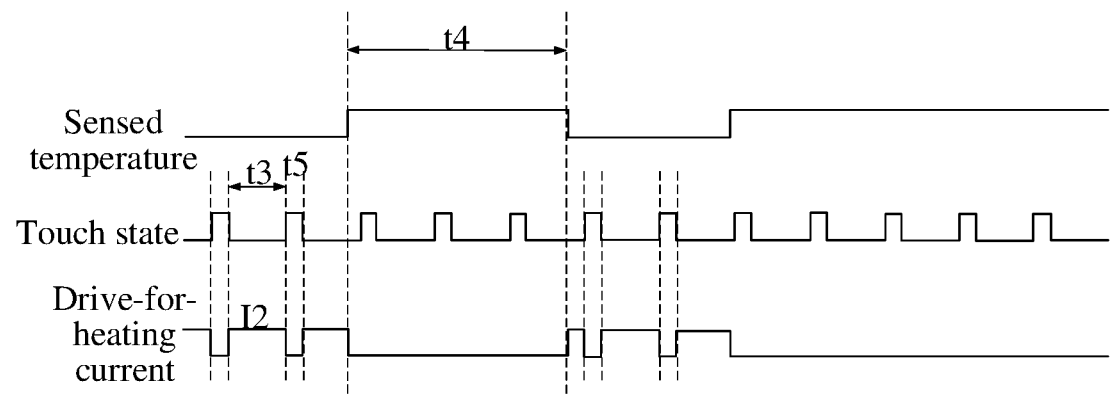
FIG. 21 shows a timing diagram corresponding to the drive-for-heating method shown in FIG. 20.

FIG. 20 shows a flowchart of a drive-for-heating method for a display device according to other exemplary embodiments of the present disclosure. FIG. 21 shows a timing diagram corresponding to the drive-for-heating method shown in FIG. 20. Referring to FIG. 20 and FIG. 21, the drive-for-heating method may include step S210 to step S270.

In step S210, the display device is controlled to start operating.

In step S220, a temperature of the display device is sensed. For example, the temperature acquisition circuit 61 may acquire the temperature of the display device at a first frequency FQ1 based on the resistance wire 51 or the temperature measurement transistor 53.

In step S230, the sensed temperature of the display device is compared with a predetermined temperature threshold. For example, it is possible to predetermine two temperature thresholds, including a first temperature threshold and a second temperature threshold. For example, the driving and controlling circuit 63 may determine the temperature sensed by the temperature measurement element 5 through a curve function or lookup table according to the received digital signal, and compare the temperature sensed by the temperature measurement element 5 with the temperature threshold.

In step S240, in response to the sensed temperature of the display device being less than the first temperature threshold, it is determined whether the display device is in a touch detection state or not.

In step S250, in response to the display device not being in the touch detection state, the heating element 3 is driven for heating.

For example, referring to the first stage t3 shown in FIG. 21, when the sensed temperature of the display device is less than the first temperature threshold and the display device is not in the touch detection state, the driving and controlling circuit 63 may generate a drive-for-heating current I2 corresponding to the sensed temperature, and output the drive-for-heating current I2 to the heating element 3 to drive the heating element 3 for heating.

In step S260, in response to the sensed temperature of the display device being greater than the second temperature threshold, the heating element 3 is driven to stop heating. For example, referring to the second stage t4 shown in FIG. 21, the driving and controlling circuit 63 may be used to drive the heating element 3 to stop heating.

In step S270, in response to the display device being in the touch detection state, the heating element 3 is driven to stop heating. For example, referring to the third stage t5 shown in FIG. 21, the driving and controlling circuit 63 may be used to drive the heating element 3 to stop heating.

In such embodiments, the drive-for-heating control is performed with the temperature and the touch operating state of the display device as parameters, that is, the temperature of the display device is monitored in real time, and a frame monitoring is performed, so that the display device is heated in a case of a low temperature and during the display stage, and the display device is not heated during the touch stage. With such drive-for-heating method, it is possible to avoid an influence of the heating process on the touch stage.

In embodiments of the present disclosure, the second temperature threshold is greater than the first temperature threshold. The first temperature threshold and the second temperature threshold are not equal to each other. The inventors found through researches that, limited by an accuracy of temperature detection, it tends to cause an oscillation problem if the first temperature threshold is equal to the second temperature threshold. By setting the first temperature threshold and the second temperature threshold to be different from each other, the oscillation problem may be avoided. For example, the second temperature threshold is 2° C. to 3° C. higher than the first temperature threshold. It should be noted that the "2° C. to 3° C." herein is just illustrative, and the numerical value or numerical range may be set according to actual situations. Embodiments of the present disclosures do not impose a special limitation on the specific numerical value or numerical range.

Figure 22:
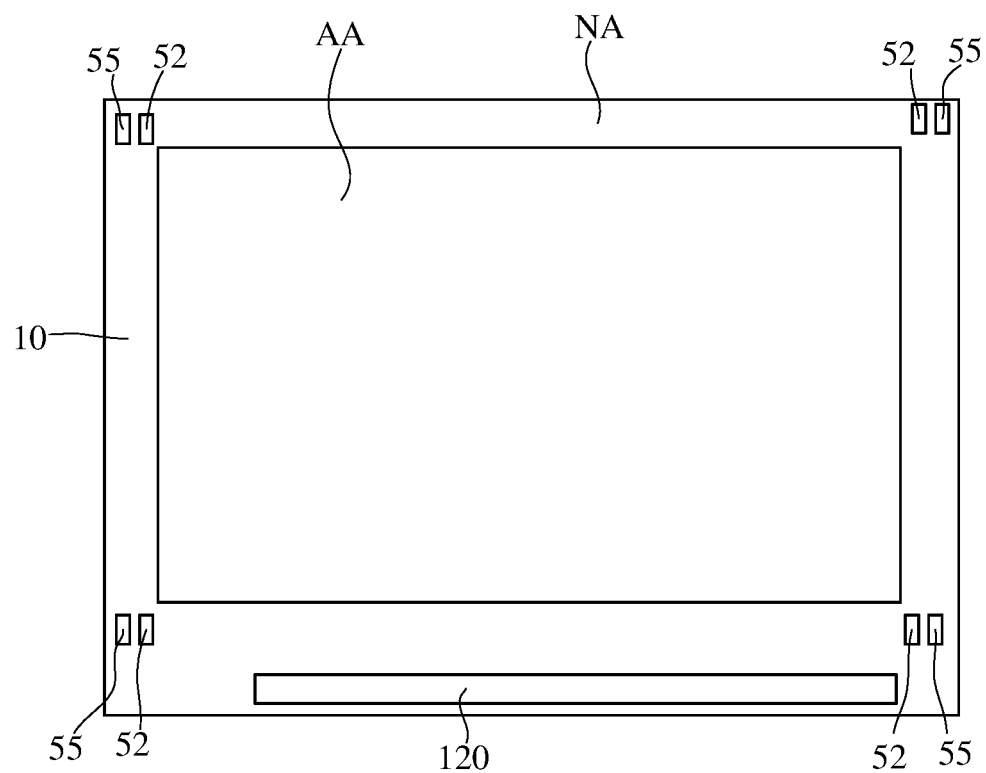
FIG. 22 shows a schematic diagram of an array substrate according to some exemplary embodiments of the present disclosure, in which the array substrate includes a temperature measurement transistor and a calibration transistor.
Figure 23:
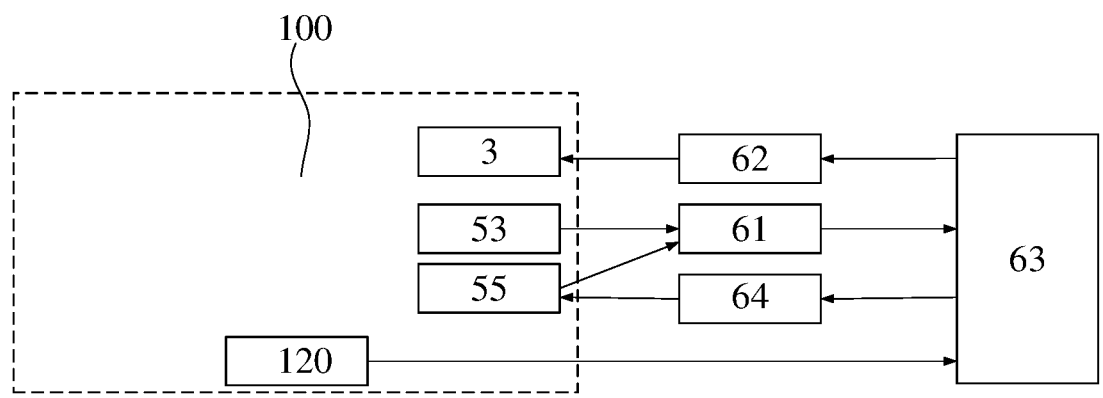
FIG. 23 shows a circuit diagram of a temperature measurement and heating portion of a display device according to some exemplary embodiments of the present disclosure.
Figure 24:
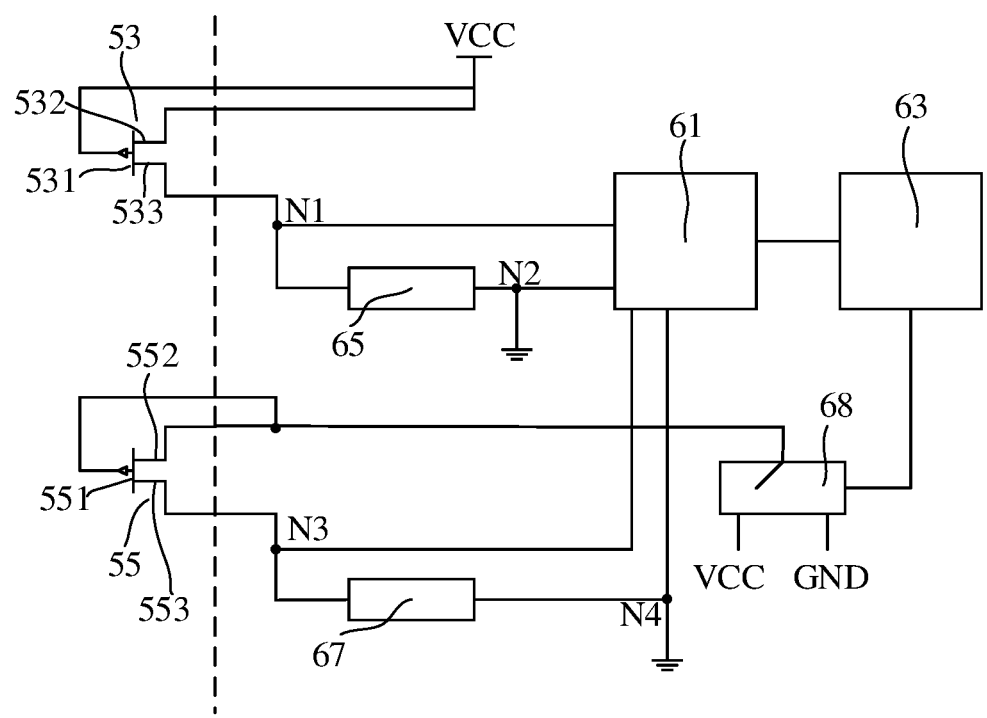
FIG. 24 shows an equivalent circuit diagram of a temperature measurement and heating portion of a display device according to some exemplary embodiments of the present disclosure.
Figure 25:
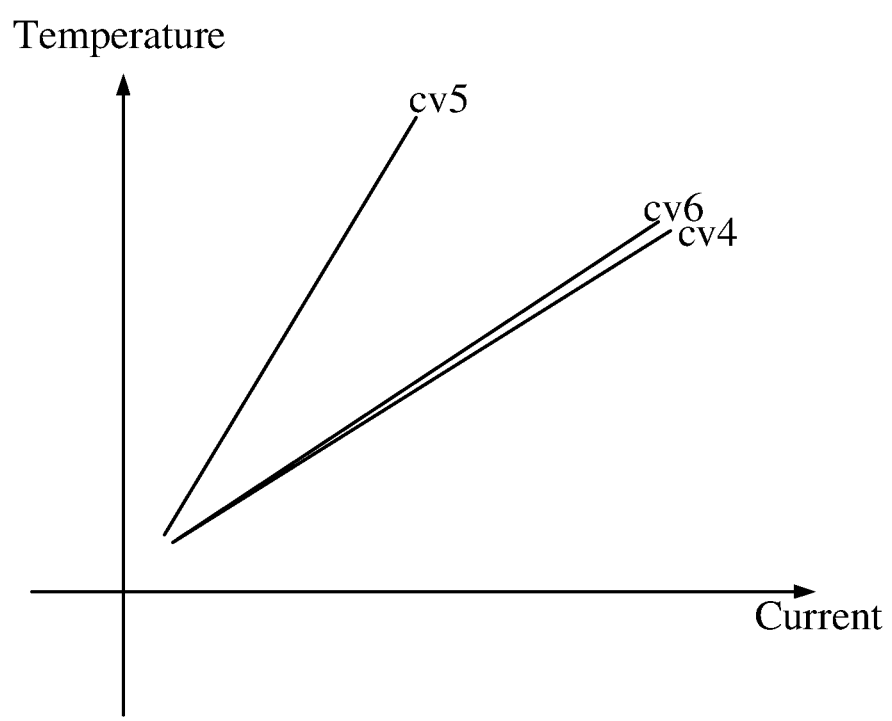
FIG. 25 schematically shows temperature-leakage current characteristic curves for a temperature measurement transistor and a calibration transistor.
Figure 26:
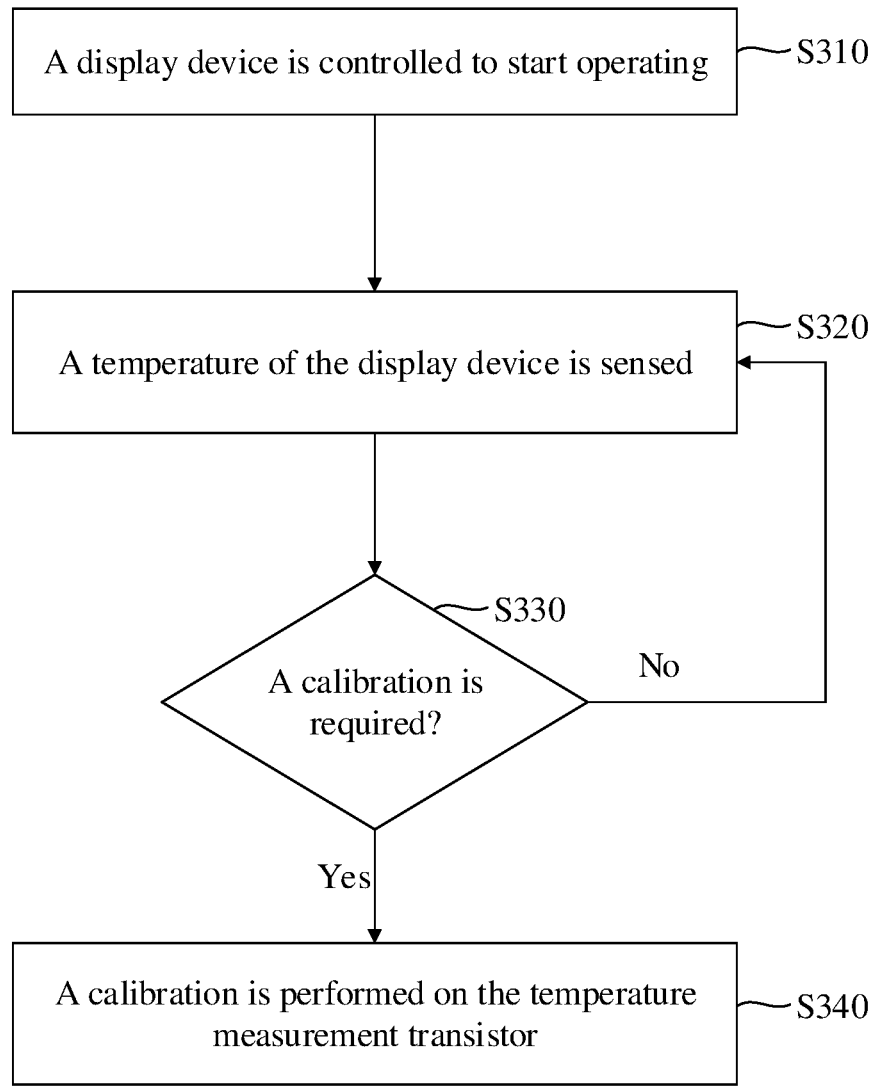
FIG. 26 shows a flowchart of a method of calibrating a temperature measurement transistor of a display device according to some exemplary embodiments of the present disclosure.
Figure 27:
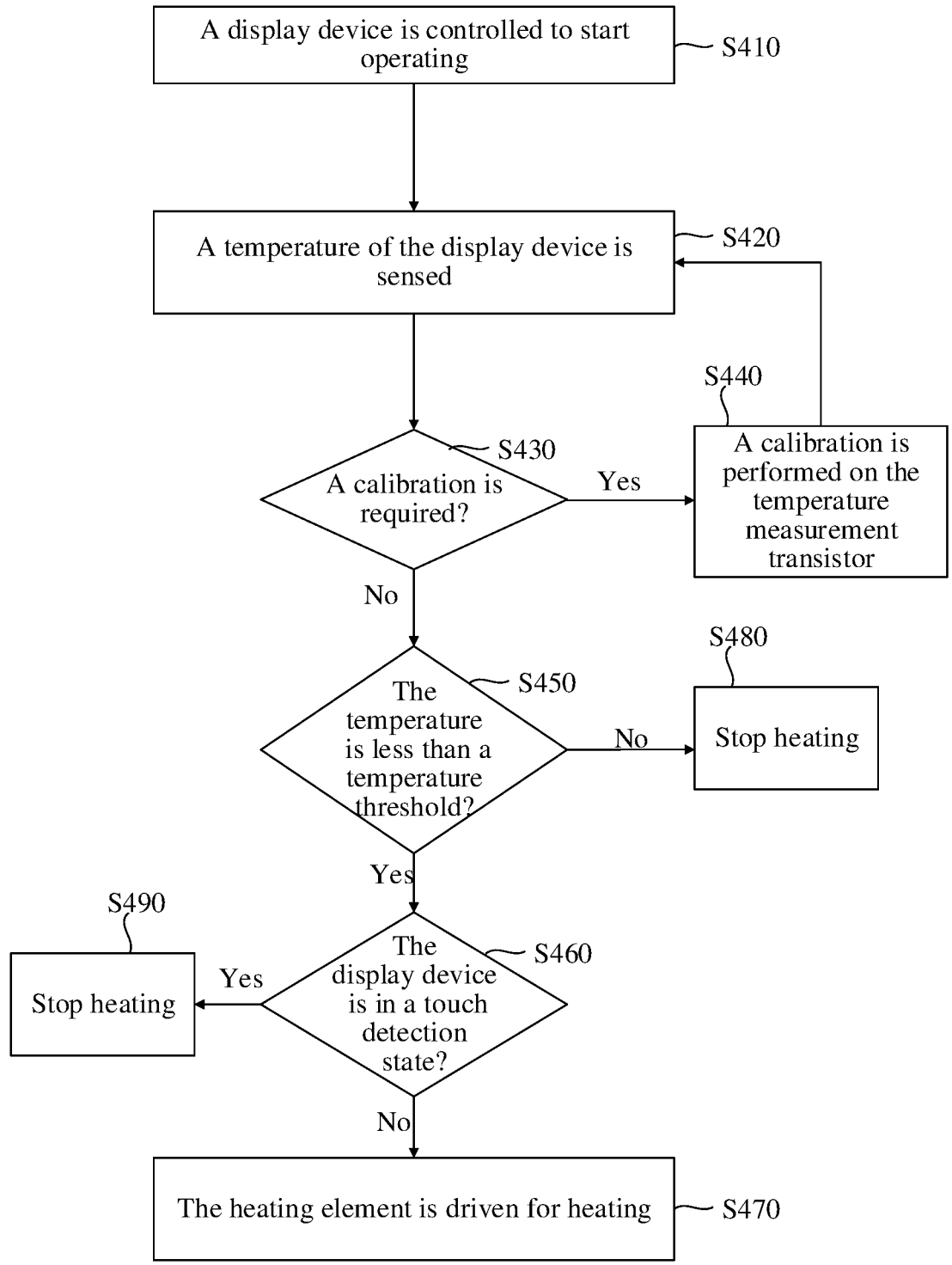
FIG. 27 shows a flowchart of a drive-for-heating method for a display device according to other exemplary embodiments of the present disclosure.

FIG. 22 shows a schematic diagram of an array substrate according to some exemplary embodiments of the present disclosure, in which the array substrate includes a temperature measurement transistor and a calibration transistor. FIG. 23 shows a circuit diagram of a temperature measurement and heating portion of a display device according to some exemplary embodiments of the present disclosure. FIG. 24 shows an equivalent circuit diagram of the temperature measurement and heating portion of the display device according to some exemplary embodiments of the present disclosure. FIG. 25 schematically shows temperature-leakage current characteristic curves for the temperature measurement transistor and the calibration transistor. FIG. 26 shows a flowchart of a method of calibrating a temperature measurement transistor of a display device according to some exemplary embodiments of the present disclosure. FIG. 27 shows a flowchart of a drive-for-heating method for a display device according to other exemplary embodiments of the present disclosure.

Referring to FIG. 22 to FIG. 27, the array substrate may include a calibration transistor 55. The inventors found through researches that in the solution of using the temperature measurement transistor 53 as the temperature measurement element, the temperature-leakage current characteristic curve of the temperature measurement transistor 53 may drift after the temperature measurement transistor 53 operates for a period of time. Accordingly, a temperature measurement accuracy of the temperature measurement transistor 53 may deteriorate with the operating time. Therefore, in embodiments of the present disclosure, after the temperature measurement transistor 53 operates for a period of time, a calibration may be performed on the temperature measurement transistor 53 using the calibration transistor 55.

Referring to FIG. 22, at least one (such as two, four, etc.) calibration transistor 55 is located in the peripheral region NA. For example, referring to FIG. 22, four calibration transistors 55 are respectively located at four corners of the peripheral region NA of the array substrate, and four calibration transistors 55 are respectively provided adjacent to the four temperature measurement transistors 53. In other words, the calibration transistors 55 and the temperature measurement transistors 53 may be provided one by one correspondingly.

Referring to FIG. 23 and FIG. 24, the drive-for-heating circuit board 6 may include: a temperature acquisition circuit 61 electrically connected to the temperature measurement element (such as temperature measurement transistor 53); a heating wire driving circuit 62 electrically connected to the heating wires 31 and 32; a temperature calibration circuit 64 electrically connected to the calibration transistor 55; and a driving and controlling circuit 63 electrically connected to the temperature acquisition circuit 61, the heating wire driving circuit 62 and the temperature calibration circuit 64. In addition, the driving and controlling circuit 63 is electrically connected to the driver chip 120.

The drive-for-heating circuit board 6 may also include a first divided resistor 65, a second divided resistor 67, and a switch selection circuit 68.

Specifically, the temperature measurement transistor 53 includes a control electrode 531, a first electrode 532, and a second electrode 533. The first electrode 532 of temperature measurement transistor 53 is electrically connected to the first voltage terminal VCC, the second electrode 533 of the temperature measurement transistor 53 is electrically connected to the node N1, and the control electrode 531 of the temperature measurement transistor 53 is electrically connected to the first voltage terminal VCC. One end of the first divided resistor 65 is electrically connected to the node N1, and the other end of the first divided resistor 65 is electrically connected to the node N2. A pin of the temperature acquisition circuit 61 is electrically connected to the node N1, an another pin of the temperature acquisition circuit 61 is electrically connected to the node N2, and still another pin of the temperature acquisition circuit 61 is electrically connected to the driving and controlling circuit 63. For example, the node N2 may be grounded.

The calibration transistor 55 includes a control electrode 551, a first electrode 552, and a second electrode 553. The control electrode 551 and the first electrode 552 of the calibration transistor 55 are electrically connected to the switch selection circuit 68. The second electrode 553 of the calibration transistor 55 is electrically connected to a node N3. A pin of the temperature acquisition circuit 61 is electrically connected to the node N3. One end of the second divided resistor 67 is electrically connected to the node N3, and the other end of the second divided resistor 67 is electrically connected to a node N4. An another pin of the temperature acquisition circuit 61 is electrically connected to the node N4. For example, the node N4 may be grounded.

A pin of the driving and controlling circuit 63 is electrically connected to the temperature acquisition circuit 61, and an another pin of the driving and controlling circuit 63 may be electrically connected to the switch selection circuit 68.

For example, the switch selection circuit 68 may provide two voltage levels, including VCC and GND. During a normal operation, i.e., during an uncalibration period, the switch selection circuit 68 is placed at a GND level, that is, three terminals of the calibration transistor 55 are connected to a GND voltage, so that there is no current in the calibration transistor 55. After an actual operation of the temperature measurement transistor 53 for a period of time, the characteristic curve of the temperature measurement transistor 53 may drift due to aging of the temperature measurement transistor 53 and other causes. During the same operating period of time, the calibration transistor 55 has not aged and still exhibits an accurate characteristic curve. As shown in FIG. 25, in an initial stage, the characteristic curve of the temperature measurement transistor 53 is substantially identical to the characteristic curve of the calibration transistor 55, as shown by a curve cv4 in FIG. 25. After the temperature measurement transistor 53 operates for a period of time, the characteristic curve of the temperature measurement transistor 53 is drifted, as shown in a curve cv5 in FIG. 25, and the characteristic curve of the calibration transistor 55 substantially did not drift, as shown in a curve cv6 in FIG. 25. During a calibration period, the voltages provided to the three terminals of the calibration transistor 55 are identical to the voltages at the three terminals of the temperature measurement transistor 53, respectively. After the temperature acquisition circuit 61 acquires data from the temperature measurement transistor 53 and the calibration transistor 55, the calibration of the temperature measurement transistor 53 is performed based on the data from the calibration transistor 55.

Referring to FIG. 26, the calibration method may include step S310 to step S350.

In step S310, a display device is controlled to start operating.

In step S320, a temperature of the display device is sensed. For example, the temperature acquisition circuit 61 may acquire the temperature of the display device at a first frequency FQ1 based on the temperature measurement transistor 53.

In step S330, it is determined whether the temperature measurement transistor 53 requires to be calibrated. For example, it is possible to predetermine an operating time period threshold, and it is determined that the temperature measurement transistor 53 requires to be calibrated when the operating time period of the temperature measurement transistor 53 reaches or exceeds the operating time period threshold.

In step S340, in response to determining that the temperature measurement transistor 53 requires to be calibrated, a calibration is performed on the temperature measurement transistor 53 using the calibration transistor 55. For example, during the calibration period, the voltages provided to the three terminals of the calibration transistor 55 are identical to the voltages provided at the three terminals of the temperature measurement transistor 53, respectively. After the temperature acquisition circuit 61 acquires data from the temperature measurement transistor 53 and the calibration transistor 55, the calibration of the temperature measurement transistor 53 is performed based on the data from the calibration transistor 55.

For example, in response to determining that the temperature measurement transistor 53 does not require to be calibrated, step S320 is continuously performed, that is, the temperature of the display device is continuously sensed. It should be noted that in the period of sensing the temperature of the display device, the display device may perform normal display, touch control, and other operations.

Referring to FIG. 27, the drive-for-heating method may include step S410 to step S490.

In step S410, a display device is controlled to start operating.

In step S420, a temperature of the display device is sensed. For example, the temperature acquisition circuit 61 may acquire the temperature of the display device at a first frequency FQ1 based on the temperature measurement transistor 53.

In step S430, it is determined whether the temperature measurement transistor 53 requires to be calibrated. For example, it is possible to predetermine an operating time period threshold, and it is determined that the temperature measurement transistor 53 requires to be calibrated when the operating time period of the temperature measurement transistor 53 reaches or exceeds the operating time period threshold.

In step S440, in response to determining that the temperature measurement transistor 53 requires to be calibrated, a calibration is performed on the temperature measurement transistor 53 using the calibration transistor 55. For example, during the calibration period, the voltages provided to the three terminals of the calibration transistor 55 are identical to the voltages at the three terminals of the temperature measurement transistor 53, respectively. After the temperature acquisition circuit 61 acquires data from the temperature measurement transistor 53 and the calibration transistor 55, the calibration of the temperature measurement transistor 53 is performed based on the data from the calibration transistor 55.

In step S450, in response to determining that the temperature measurement transistor 53 does not require to be calibrated, the sensed temperature of the display device is compared with a predetermined temperature threshold. For example, it is possible to predetermine two temperature thresholds, including a first temperature threshold and a second temperature threshold. For example, the driving and controlling circuit 63 may determine the temperature sensed by the temperature measurement element 5 through a curve function or lookup table according to the received digital signal, and compare the temperature sensed by the temperature measurement element 5 with the temperature threshold.

In step S460, in response to the sensed temperature of the display device being less than the first temperature threshold, it is determined whether the display device is in a touch detection state.

In step S470, in response to the display device not being in the touch detection state, the heating element 3 is driven for heating.

In step S480, in response to the sensed temperature of the display device being greater than the second temperature threshold, the heating element 3 is driven to stop heating.

In step S490, in response to the display device being in the touch detection state, the heating element 3 is driven to stop heating.

In such embodiments, the drive-for-heating control is performed with the temperature and the touch operating state of the display device as parameters, that is, the temperature of the display device is monitored in real time, and a frame monitoring is performed, so that the display device is heated in a case of a low temperature and during the display stage, and the display device is not heated during the touch stage. With such drive-for-heating method, it is possible to avoid an influence of the heating process on the touch stage.

It should be understood that the touch display panel and the display device according to embodiments of the present disclosure have all the features and advantages of the above-mentioned display substrate. The details may be referred to the above descriptions and will not be repeated here.

It should be understood that the display device may include any apparatus or product having a display function. For example, the display device may be a smart phone, a mobile phone, an e-book reader, a desktop personal computer (PC), a laptop PC, a netbook PC, a personal digital assistant (PDA), a portable multimedia player (PMP), a digital audio player, a mobile medical apparatus, a camera, a wearable apparatus (such as a head-mounted apparatus, electronic clothing, electronic bracelet, electronic necklace, electronic accessory, electronic tattoo, or smart watch), a television, etc. The display device may also be a vehicle display device, such as an automotive rearview mirror, etc.

Although some embodiments of general technical concepts of the present disclosure have been illustrated and described, it should be understood by those ordinary skilled in the art that these embodiments may be changed without departing from the principle and spirit of the general technical concepts of the present disclosure. The scope of the present disclosure is defined by the claims and their equivalents.

What is claimed is:

1. An array substrate, comprising:
a first base substrate;
a plurality of pixel units on the first base substrate, wherein the plurality of pixel units are arranged in an array in a first direction and a second direction, at least one of the plurality of pixel units comprises a pixel driving circuit, and the pixel driving circuit comprises at least one thin film transistor;
at least one data line on the first base substrate;
at least one touch signal line on the first base substrate;
a heating element on the first base substrate, wherein the heating element is configured to generate heat under a driving of a drive-for-heating current;
a common electrode on the first base substrate, wherein the common electrode is reused as a touch electrode, and the touch electrode is electrically connected to the touch signal line; and
a pixel electrode on the first base substrate, wherein the pixel electrode is electrically connected to the data line through the pixel driving circuit,
wherein the array substrate comprises: a semiconductor layer on the first base substrate; a first conductive layer on a side of the semiconductor layer away from the first base substrate; a second conductive layer on a side of the first conductive layer away from the first base substrate; a third conductive layer on a side of the second conductive layer away from the first base substrate; and a fourth conductive layer on a side of the third conductive layer away from the first base substrate,
wherein the at least one thin film transistor comprises an active layer and a gate electrode, the active layer is in the semiconductor layer, the gate electrode is in the first conductive layer, the data line is in the second conductive layer, one of the pixel electrode and the common electrode is in the third conductive layer, and the other of the pixel electrode and the common electrode is in the fourth conductive layer,
wherein a layer in which the heating element is located is between the semiconductor layer and the third conductive layer,
wherein the array substrate further comprises a gate line provided on the first base substrate, and the heating element comprises a plurality of first heating wires, and the plurality of first heating wires and the gate line are in the first conductive layer,
wherein a plurality of gate lines extend in the first direction and are spaced apart in the second direction, and the plurality of first heating wires extend in the first direction and are spaced apart in the second direction, and any two of the plurality of first heating wires and the plurality of gate lines are spaced apart in the second direction,
wherein each of the at least one data line comprises a first data line portion, a second data line portion, and a third data line portion between the first data line portion and the second data line portion, the first data line portion extends in a third direction intersecting with the second direction, and the second data line portion extends in a fourth direction intersecting with the second direction, and
wherein an orthographic projection of at least one of the plurality of first heating wires on the first base substrate overlaps at least partially with an orthographic projection of at least one third data line portion on the first base substrate.

2. The array substrate according to claim 1, wherein the heating element further comprises a plurality of second heating wires, and the plurality of second heating wires and the data line are in the second conductive layer.

3. The array substrate according to claim 1, wherein at least one pixel unit of the plurality of pixel units comprises a plurality of sub-pixels, and the orthographic projection of at least one first heating wire on the first base substrate extends through an orthographic projection of a plurality of the third data line portions of a row of sub-pixels on the first base substrate.

4. The array substrate according to claim 1, wherein:
the plurality of first heating wires and the plurality of gate lines are alternately arranged in the second direction; and/or
a ratio of a number of the plurality of first heating wires to a number of the plurality of gate lines is 1:1.

5. The array substrate according to claim 2, wherein a plurality of data lines are spaced apart in the first direction,
wherein the plurality of second heating wires are spaced apart in the first direction, and any two of the plurality of second heating wires and the plurality of data lines are spaced apart in the first direction,
wherein a plurality of touch signal lines are spaced apart in the first direction, and
wherein any two of the plurality of second heating wires, the plurality of data lines and the plurality of touch signal lines are spaced apart in the first direction.

6. The array substrate according to claim 5, wherein the pixel unit comprises N sub-pixels, the at least one data line is configured to provide data signals to the pixel driving circuits of a column of sub-pixels, and the touch signal line is electrically connected to touch electrodes of N columns of sub-pixels, wherein N is greater than or equal to 2, and wherein N data lines and/or one touch signal line are/is arranged in the first direction between any two adjacent second heating wires among the plurality of second heating wires.

7. The array substrate according to claim 5, wherein each second heating wire comprises a first heating wire portion, a second heating wire portion, and a third heating wire portion between the first heating wire portion and the second heating wire portion, the first heating wire portion extends in a third direction intersecting with the second direction, and the second heating wire portion extends in a fourth direction intersecting with the second direction.

8. The array substrate according to claim 1, wherein the array substrate comprises a display region and a peripheral region, the plurality of pixel units are in the display region, the array substrate comprises a first side, a second side, a third side, and a fourth side, the first side and the second side are opposite to each other, and the third side and the fourth side are opposite to each other, wherein the array substrate further comprises a gate driving circuit and a data driving circuit in the peripheral region, the gate driving circuit is on at least one of the first side or the second side of the array substrate, and the data driving circuit is on the third side of the array substrate, and wherein the array substrate further comprises a heating element binding region in the peripheral region, the heating element binding region is on a side of the gate driving circuit away from the display region, and the plurality of first heating wires extend to the heating element binding region.

9. The array substrate according to claim 1, wherein the array substrate comprises a display region and a peripheral region, the plurality of pixel units are in the display region, the array substrate comprises a first side, a second side, a third side, and a fourth side, the first side and the second side are opposite to each other, and the third side and the fourth side are opposite to each other, wherein the array substrate further comprises a gate driving circuit and a data driving circuit in the peripheral region, the gate driving circuit is on at least one of the first side or the second side of the array substrate, and the data driving circuit is on the third side of the array substrate, and wherein the array substrate further comprises a heating element binding region in the peripheral region, the heating element binding region is on the third side of the array substrate, the array substrate further comprises at least one heating element lead in the peripheral region, and the plurality of first heating wires are electrically connected to a pad in the heating element binding region through the at least one heating element lead.

10. The array substrate according to claim 2, wherein the array substrate comprises a display region and a peripheral region, the plurality of pixel units are in the display region, the array substrate comprises a first side, a second side, a third side, and a fourth side, the first side and the second side are opposite to each other, and the third side and the fourth side are opposite to each other, wherein the array substrate further comprises a gate driving circuit and a data driving circuit in the peripheral region, the gate driving circuit is on at least one of the first side or the second side of the array substrate, and the data driving circuit is on the third side of the array substrate, and wherein the array substrate further comprises a heating element binding region in the peripheral region, the heating element binding region is on the fourth side of the array substrate, and the plurality of second heating wires extend to the heating element binding region.

11. The array substrate according to claim 1, wherein the array substrate further comprises a temperature measurement element provided on the first base substrate, and the temperature measurement element is configured to sense a temperature of a region in which the temperature measurement element is located.

12. The array substrate according to claim 11, wherein the temperature measurement element comprises a plurality of resistance wires extending in the first direction and spaced apart in the second direction, and wherein any two of the plurality of first heating wires, the plurality of gate lines and the plurality of resistance wires are spaced apart in the second direction.

13. The array substrate according to claim 11, wherein the temperature measurement element comprises at least one temperature measurement transistor, wherein the array substrate comprises a display region and a peripheral region, and the plurality of pixel units are in the display region, wherein the at least one temperature measurement transistor is in the peripheral region, and wherein the temperature measurement element further comprises at least one calibration transistor configured to calibrate the at least one temperature measurement transistor, and the at least one calibration transistor is in the peripheral region.

14. A display device, comprising:
the array substrate according to claim 11; and
a drive-for-heating circuit board, wherein the temperature measurement element is electrically connected to the drive-for-heating circuit board,
wherein the drive-for-heating circuit board comprises:
a temperature acquisition circuit electrically connected to the temperature measurement element;
a drive-for-heating circuit electrically connected to the heating element; and
a driving and controlling circuit electrically connected to the temperature acquisition circuit and the drive-for-heating circuit, wherein the driving and controlling circuit is configured to generate a drive-for-heating current according to a temperature acquired by the temperature acquisition circuit and provide the drive-for-heating current to the drive-for-heating circuit.

15. A drive-for-heating method for the display device according to claim 14, comprising:
sensing a temperature by using the temperature measurement element; and
generating, in response to a sensed temperature being less than a first temperature threshold, a drive-for-heating current according to the sensed temperature,
and heating the display device by using the heating element.

16. The array substrate according to claim 1, wherein the array substrate further comprises a temperature measurement element provided on the first base substrate, and the temperature measurement element is configured to sense a temperature of a region in which the temperature measurement element is located, and wherein the temperature measurement element comprises a plurality of resistance wires extending in the second direction and spaced apart in the first direction, and any two of the plurality of second heating wires, the plurality of data lines and the plurality of resistance wires are spaced apart in the first direction.

* * * * *